United States Patent
Hossack et al.

(10) Patent No.: US 6,918,877 B2
(45) Date of Patent: Jul. 19, 2005

(54) METHOD AND SYSTEM FOR REDUCING UNDESIRABLE CROSS TALK IN DIAGNOSTIC ULTRASOUND ARRAYS

(75) Inventors: John A. Hossack, Charlottesville, VA (US); Gregory L. Woicik, Ben Lomond, CA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 155 days.

(21) Appl. No.: 10/635,687

(22) Filed: Aug. 5, 2003

(65) Prior Publication Data

US 2005/0033181 A1 Feb. 10, 2005

(51) Int. Cl.[7] .................................................. A61B 8/00
(52) U.S. Cl. ......................................................... 600/447
(58) Field of Search ................................ 600/437–472; 367/174, 181, 7, 11, 130, 138; 128/916

(56) References Cited

U.S. PATENT DOCUMENTS

| | | | |
|---|---|---|---|
| 4,413,520 A | 11/1983 | Murakami et al. | |
| 4,801,835 A | 1/1989 | Nakaya et al. | |
| 4,960,320 A | 10/1990 | Taniura | |
| 4,984,465 A | 1/1991 | Piel, Jr. et al. | |
| 5,105,666 A | 4/1992 | Steinacher | |
| 5,160,870 A | 11/1992 | Carson et al. | |
| 5,167,231 A | 12/1992 | Matsui | |
| 5,175,709 A | 12/1992 | Slayton et al. | |
| 5,241,209 A | 8/1993 | Sasaki | |
| 5,296,777 A | 3/1994 | Mine et al. | |
| 5,406,163 A | 4/1995 | Carson et al. | |
| 5,938,612 A | * | 8/1999 | Kline-Schoder et al. .... 600/459 |
| 5,962,790 A | | 10/1999 | Lynnworth et al. |
| 6,135,963 A | * | 10/2000 | Haider ........................ 600/447 |
| 6,262,946 B1 | * | 7/2001 | Khuri-Yakub et al. ...... 367/181 |
| 6,359,375 B1 | | 3/2002 | Guo et al. |
| 2004/0174773 A1 | * | 9/2004 | Thomenius et al. ......... 367/174 |

OTHER PUBLICATIONS

"3D Simulation of Controlled Micromachined Capacitive Ultrasound Transducers," by M. Kaltenbacher, H. Landes, K. Neiderer, and R. Lerch at the University of Erlangen, Germany; 1999 IEEE Ultrasonics Symposium; pp. 1155–1158.

"A New Vibration Mode in Tall, Narrow Piezoelectric Elements," by John D. Larson at H–P Laboratories, Hewlett–Packard Company; 1979 IEEE Ultrasonics Symposium; pp. 108–113.

(Continued)

*Primary Examiner*—Ali Imam

(57) ABSTRACT

Practical diagnostic ultrasound arrays invariably exhibit a degree of unwanted inter-element cross coupling or cross talk. This results in degraded beam performance that in turn results in degraded image resolution (spatial resolution and contrast performance). Current approaches to reducing inter element coupling may be costly and may make the transducer array fragile. There is a need to overcome the cross talk problem with minimal expense and impact on reliability. The approach taken here overcomes a substantial component of the cross talk with minimal expense. The approach is versatile and has applicability in both transmit and receive. The approach improves image resolution. This technique has particular applicability in the field of silicon substrate based MEMS transducers in which the continuous, low loss, silicon wafer substrate gives rise to significant unwanted cross talk.

23 Claims, 20 Drawing Sheets

OTHER PUBLICATIONS

"Investigation of Cross–Coupling in 1–3 Piezocomposite Arrays," by D. Certon, N. Felix, Student Member, IEEE, E. Lacase, F. Teston, and F. Patat; IEEE Transactions on Ultrasonics, Ferroelectrics, and Frequency Control, vol. 48, No. 1; dated Jan. 2001; pp. 85–92.

"Radiation Pattern Distortion Caused by the Interelement Coupling in Linear Array Transducers," by N. Lamberti; 1999 IEEE Ultrasonics Symposium; pp. 1071–1075.

"Non–Ideal Radiators in Phased Array Transducers," by J. D. Larson at Hewlett–Packard Laboratories; 1981 Ultrasonics Symposium; pp. 673–684.

"Crosstalk Reduction With a Micromachined Diaphragm Structure for Integrated Ultrasound Transducer Arrays," by J.H. Mo, Student Member, IEEE, J. Brian Fowlkes, A. L. Roginson, Member, IEEE, and P. L. Carson; 1992 IEEE Transactions on Ultrasonics, Ferroelectrics, and Frequency Control, vol. 39, No. 1; dated Jan. 1992; pp. 48–53.

"Cross–Talk Paths in Array Transducers," by J.F. Guess, C.G. Oakley, S.J. Douglas and R.D. Morgan; 1995 IEEE Ultrasonics Symposium; pp. 1279–1282.

"Crosscoupling Analysis for Wideband Arrays," by R. Johnson; 1995 IEEE Ultrasonics Symposium; pp. 1349–1352.

"Time–Domain Modeling of Composite Arrays for Underwater Imaging," by G. L. Wojcik, D.K. Vaughan, V. Murray, and J. Mould Jr.; 1994 Ultrasonics Symposium; pp. 1027–1032.

"Evaluation of Laser Probe Performances for Measuring Cross–Coupling in 1–3 Piezocomposite Arrays," by D. Certon, N. Felix, L. Pascal, T.H. Hue, F. Patat, and M. Lethiecq; 1999 IEEE Ultrasonics Symposium; pp. 1091–1094.

"Theory for Cross–Coupling," by G.S. Kino and R. Bear; 1983 Ultrasonics Symposium; pp. 1013–1019.

"Radiation from Finite Phased and Focused Linear Array Including Interaction," by J. Assaad and C. Bruneel; 1997 Acoustical Society of America; Received May 1, 1996 and accepted Oct. 27, 1996; pp. 1859–1867.

"3D Simulation of Controlled Micromachined Capacitive Ultrasound Transducers," by M. Kaltenbacher, H. Landes, K. Nieder, and R. Lerch; 1999 IEEE Ultrasonics Symposium; pp. 1155–1158.

"Time–Domain Models of MUT Array Cross–Talk in Silicon Substrates," by G. Wojcik, J. Mould, and P. Reynolds A. Fitzgerald, P. Wagner, and Igal Ladabaum; 2000 IEEE Ultrasonics Symposium.

"Experimental Investigation of Cross–Coupling and its Influence on the Elementary Radiation Pattern in 1D Ultrasound Arrays," by N. Felix, D. Ceron, E. Lacaze, M. Lethiecq, and F. Patat; 1999 IEEE Ultrasonics Symposium; pp. 1053–1056.

"An Experimental Investigation of the Cross–Coupling Between Elements of an Acoustic Imaging Array Transducer," by J. Fleming Dias; 1982 by Academic Press, Inc.; Ultrasonic Imaging vol. 4, pp. 44–55 (1982)3.

"Silicon Substrate Ringing in Microfabricated Ultrasonic Transducers," by Igal Ladabaum P. Wagner, C. Zanelli, J Mould, P. Reynolds, and G. Wojcik; 2000 IEEE Ultrasonics Symposium.

"Prediction and Measurement of Cross–Talk Effects in a Periodic Linear Array Built Using Ultrasound Micormachining," by S. Ballandras, P.F. Edona, F. Langrognet, W. Steichem, and G. Perre; 2000 IEEE Ultrasonics Symposium.

* cited by examiner

METHOD AND SYSTEM FOR REDUCING UNDESIRABLE CROSS TALK IN DIAGNOSTIC ULTRASOUND ARRAYS

BACKGROUND

Diagnostic Ultrasound is one of the most versatile, lowest cost and widely used diagnostic imaging modalities in use today. These systems have a controller that controls transmit and receive functions. The conversion of electrical energy to acoustic energy and vice versa is performed by a transducer array in which individual adjacent elements are separately phased in transmit and receive in order to focus the acoustic beam at discrete spatial locations. In the ideal ultrasonic array, the adjacent elements operate entirely independently of each other. If they do not operate independently—i.e. there is 'cross talk'—then the beam is distorted and a degraded image results. The cross talk can have its origin in either electrical (capacitive) cross talk or acoustic propagation cross talk. Generally, electrical cross talk is instantaneous and acoustic cross talk results in a delayed cross talk signal due to the much slower propagation velocity of acoustic waves versus electromagnetic/electrostatic coupling. Current designs achieve cross talk of the order of −30 dB for each of electrical cross talk and acoustic cross talk. Further reductions in cross talk may result in image quality improvement. Additionally, if an effective means was found for suppressing cross talk then some of the intricacies currently employed in transducer design may be avoidable. A cost reduction in array design may result. An alternative approach to reducing cross talk may also help to facilitate the acceptance of new transducer technologies such as electrostatic MEMS transducers that while being very low cost, experience significant element to element acoustical cross talk due to their continuous silicon substrate.

BRIEF SUMMARY

The present invention is defined by the following claims, and nothing in this section should be taken as a limitation on those claims. By way of introduction, the preferred embodiments described below include methods and systems for reducing undesirable cross-talk in ultrasound arrays.

Transmit Mode

Each array element is excited by an electrical waveform. Historically these waveforms were simple in form—impulses, steps or square wave bursts. However, the current state of the art is to use a programmable waveform. The major driving factor for this is desire to reduce transmitted harmonic signals since it is now current practice to form the received signal image at the second harmonic of the transmitted signal since the second harmonic signal gives rise to a far higher quality image. This imaging technique is typically referred to as "Harmonic Imaging". The significance of the need to reduce the transmitted second harmonic is that it is preferable to program the shape of the transmitted waveform using some form of digital waveform encoding that is fed into a D->A converter prior to amplification. Patents describing this technique in detail include Cole U.S. Pat. No. 5,675,554 and Hossack U.S. Pat. No. 5,740,128 (of which are hereby incorporated by reference herein).

As a central array element is excited by its associated waveform generating channel, a smaller signal is generated from its adjacent elements. The cross talk signal may be in the range (for example) −20 dB to −40 dB in amplitude with respect to the central array element and is delayed by some fraction of a microsecond. The actual output of the adjacent element can be measured using a needle hydrophone or estimated using a complex transducer model for the transducer design in use. PZFlex Finite Element Analysis (Weidlinger Associates, Los Altos, Calif.) is a well known method for comprehensive transducer modeling suitable for predicting the cross talk signal.

The function of the array can be described by a transfer function matrix relating input electrical excitations of one or more elements to measured output pressure responses at multiple measurement points in the field. Generally, these measurement points are very close to the transducer so that the crosstalk component can be more easily distinguished from diffracted components from adjacent elements. (i.e. in the very near field, we are measuring the output of the adjacent element in isolation from diffracted components from neighbors).

Generally, the initial case with a single element being excited is considered with the desire that the output of neighboring elements be as close to zero as possible. This condition is satisfied when there is no array crosstalk or crosstalk has been adequately suppressed or cancelled.

Beamforming generally starts by assuming that each element is operating independently and that the total field energy is derived from a linear summation of contributions from all elements taking account of diffraction and attenuation effects. Thus, the solution of crosstalk problem for the case of a single element can be superimposed on the required excitations (and their associated required crosstalk cancellation signals) so as to achieve the required beamforming effect. Thus, the beamforming task is separated from the crosstalk cancellation task. The beamforming may require nonlinear analysis when the sound intensities are finite. This is commonly the case in harmonic imaging (imaging at the second harmonic of the transmit signal from either tissue or contrast agent bubbles). Even in this case, the beamforming process at the array elements is considered in a linear fashion—i.e. that all element contributions can be considered in isolation and then added when the nonlinear calculation is required. (Typically, the nonlinear component is practically zero immediately adjacent to the transducer since the harmonic signal accumulates as the wave passes through the media in front of the array.)

The transfer function is most easily analyzed as an impulse response function in the frequency domain. Therefore, in measurements and simulations, the time domain responses, H(t), are measured, but are converted to frequency domain counterparts, H(f), using a Fourier transform. Conversely, once a required excitation is defined in the frequency domain, the time domain equivalent is calculated via an inverse Fourier transform.

The pressure output, Pi, from the $i^{th}$ element can be represented using the following matrix equation (Equation 1) where H (abbreviated from H(f)) is the transfer function matrix relating input voltages, Vi, to the output pressures, $P_i$. This example is for a 9 element array but can be expanded as required. FIG. 14 illustrates this configuration. We will consider the ideal case where an impulse is applied to the center element. V5 is an impulse (all 1's in the frequency domain). V1 to V4 and V6 to V9 are zero. P5 is the direct output from the 5th element. However, since some of the non-diagonal terms in the H matrix are non zero, there will be finite output from the other elements—i.e. some of $P_1$ to $P_4$ and $P_6$ to $P_9$ will be non zero. Once the matrix H is defined, we can solve the matrix problem to find values for $V_1$ to $V_9$ such that we do actually get the desired output—i.e. $P_1$ to $P_4$=0, $P_5$=ideal impulse response of the 5th element and $P_6$ to $P_9$=0.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & H_{13} & H_{14} & H_{15} & H_{16} & H_{17} & H_{18} & H_{19} \\ H_{21} & H_{22} & H_{23} & H_{24} & H_{25} & H_{26} & H_{27} & H_{28} & H_{29} \\ H_{31} & H_{32} & H_{33} & H_{34} & H_{35} & H_{36} & H_{37} & H_{38} & H_{39} \\ H_{41} & H_{42} & H_{43} & H_{44} & H_{45} & H_{46} & H_{47} & H_{48} & H_{49} \\ H_{51} & H_{52} & H_{53} & H_{54} & H_{55} & H_{56} & H_{57} & H_{58} & H_{59} \\ H_{61} & H_{62} & H_{63} & H_{64} & H_{65} & H_{66} & H_{67} & H_{68} & H_{69} \\ H_{71} & H_{72} & H_{73} & H_{74} & H_{75} & H_{76} & H_{77} & H_{78} & H_{79} \\ H_{81} & H_{82} & H_{83} & H_{84} & H_{85} & H_{86} & H_{87} & H_{88} & H_{89} \\ H_{91} & H_{92} & H_{93} & H_{94} & H_{95} & H_{96} & H_{97} & H_{98} & H_{99} \end{bmatrix} \begin{bmatrix} V_1 \\ V_2 \\ V_3 \\ V_4 \\ V_5 \\ V_6 \\ V_7 \\ V_8 \\ V_9 \end{bmatrix} \quad (1)$$

In fact, cross coupling is only significant on a few neighboring elements. In the case below, cross coupling is limited to two elements on each side of the element being excited. (However, this is not a limitation here—the full matrix encompassing all crosstalk terms is considered if desired.) The matrix becomes a banded matrix with band width 5. All other values of H are 0. This simplifies the characterization of the H matrix and allows for more efficient matrix solution.

Notice that there is significant symmetry in the matrix. We typically assume that crosscoupling (crosstalk) from array element 3 to array element 4 is the same as from array element 4 to array element 5—and so on. There might be some irregular behavior at the ends of the array due to different boundary conditions. However, even in this case, the change in crosstalk is probably modest since it is common practice to have one or two "dummy" elements that are used during manufacture to ensure alignment of the saw blade with the required kerf before dicing the 'real' elements. For the matrix shown below, the crosstalk function of the two adjacent elements resulting from impulse excitation of a central element is measured. Thereafter, using the 'direct' output from the central element and the crosstalk measurements, the banded matrix is populated.

For example, we set $V_5=1$ (impulse excitation) and $V_1$ to $V_4$ and $V_6$ to $V_9=0$. $H_{55}$ is defined by the 'direct' output $P_5$. $H_{54}$ and $H_{56}$ are defined by the output on the neighboring element. $H_{53}$ and $H_{57}$ are defined by the output on the second neighboring element. Thereafter, the symmetry of the matrix is used to completely populate the banded matrix.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & H_{13} & 0 & 0 & 0 & 0 & 0 & 0 \\ H_{21} & H_{22} & H_{23} & H_{24} & 0 & 0 & 0 & 0 & 0 \\ H_{31} & H_{32} & H_{33} & H_{34} & H_{35} & 0 & 0 & 0 & 0 \\ 0 & H_{42} & H_{43} & H_{44} & H_{45} & H_{46} & 0 & 0 & 0 \\ 0 & 0 & H_{53} & H_{54} & H_{55} & H_{56} & H_{57} & 0 & 0 \\ 0 & 0 & 0 & H_{64} & H_{65} & H_{66} & H_{67} & H_{68} & 0 \\ 0 & 0 & 0 & 0 & H_{75} & H_{76} & H_{77} & H_{78} & H_{79} \\ 0 & 0 & 0 & 0 & 0 & H_{86} & H_{87} & H_{88} & H_{89} \\ 0 & 0 & 0 & 0 & 0 & 0 & H_{97} & H_{98} & H_{99} \end{bmatrix} \begin{bmatrix} V_1 \\ V_2 \\ V_3 \\ V_4 \\ V_5 \\ V_6 \\ V_7 \\ V_8 \\ V_9 \end{bmatrix} \quad (2)$$

The impulse responses can be measured experimentally using a small hydrophone placed close to each element in a water bath. Suitable hydrophones are needle PVDF hydrophones or the 'Golden Lipstick' from Onda Corp, Sunnyvale, Calif. Alternatively, a prediction of the direct transfer function and crosstalk can be made using a suitable computer model—such as using PZFlex Finite Element Software (WAI, Los Altos, Calif.) or ANSYS (ANSYS Inc., Canonsburg, Pa.). Frequently, the true impulse response is not calculated due to the practical difficulty of modeling a true impulse. A more practical approach is to use a square wave excitation (or similar finite short pulse) of sufficiently high bandwidth to produce a relatively unfiltered response. The output response (in the frequency domain) can be divided by the frequency domain representation of the excitation pulse to derive the impulse response.

The matrix solution can be performed in any of a number of ways. One approach is Gaussian elimination. Another approach is to use the matrix solution command in Matlab (MathWorks Inc., Natick, Mass.) (the '\' command, or 'mldivide').

The approach can be extended to an over constrained case. For example, field sample points may be placed closer together in the field than that corresponding to array element spacing. For example, one field sample point may be placed between array element centers. In this case we consider the example where there are 5 array elements and 9 field measurement points. FIG. 15 illustrates this configuration. There are 5 field points lying adjacent to the array element centers and 4 points lying intermediate between these 5 field points. In this case we have more defined 'output' conditions than defined 'inputs'. Thus, the problem is over constrained and needs a pseudoinverse solution. This will find a best fitting solution in a least squares sense. The Matlab 'pinv' command implements this operation in an efficient and easy to use manner.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & H_{13} & H_{14} & H_{15} \\ H_{21} & H_{22} & H_{23} & H_{24} & H_{25} \\ H_{31} & H_{32} & H_{33} & H_{34} & H_{35} \\ H_{41} & H_{42} & H_{43} & H_{44} & H_{45} \\ H_{51} & H_{52} & H_{53} & H_{54} & H_{55} \\ H_{61} & H_{62} & H_{63} & H_{64} & H_{65} \\ H_{71} & H_{72} & H_{73} & H_{74} & H_{75} \\ H_{81} & H_{82} & H_{83} & H_{84} & H_{85} \\ H_{91} & H_{92} & H_{93} & H_{94} & H_{95} \end{bmatrix} \begin{bmatrix} V_1 \\ V_2 \\ V_3 \\ V_4 \\ V_5 \end{bmatrix} \quad (3)$$

In this case, the matrix may also be banded due to finite crosstalk. In the following example, crosstalk is limited to the first neighboring element. Again, the values of H can be derived either experimentally or using a computer model. As before, once a small number of crosstalk measurements are made, the matrix can be fully populated by using the symmetry of the system.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & 0 & 0 & 0 \\ H_{21} & H_{22} & 0 & 0 & 0 \\ H_{31} & H_{32} & H_{33} & 0 & 0 \\ 0 & H_{42} & H_{43} & 0 & 0 \\ 0 & H_{52} & H_{53} & H_{54} & 0 \\ 0 & 0 & H_{63} & H_{64} & 0 \\ 0 & 0 & H_{73} & H_{74} & H_{75} \\ 0 & 0 & 0 & H_{84} & H_{85} \\ 0 & 0 & 0 & H_{94} & H_{95} \end{bmatrix} \begin{bmatrix} V_1 \\ V_2 \\ V_3 \\ V_4 \\ V_5 \end{bmatrix} \quad (4)$$

In the above two matrix problems, a least squares best fitting solution for finding the required excitations of $V_1$ to $V_5$ to produce finite output on only one selected element is found using a pseudoinverse operation on matrix H.

The above technique can be used in the receive mode. This receive mode correction involves (to first order) subtraction of scaled and delayed representations of adjacent element signals from the first element's signal. The processing to reduce crosstalk is described below in the section: Alternative, non-matrix approach to crosstalk reduction calculation.

Notice that if a parasitic crosstalk wave is eliminated in either transmit or receive, then generally that is sufficient. If the sidelobe resulting from crosstalk is eliminated in either transmit or receive, then that sidelobe will be 'invisible' in a pulse echo operation.

The method can be used in all types of medical ultrasound arrays: 1D, 1.5D, 2D, curved and flat, piezoelectric (PZT, PZN etc,), electrostatic (e.g. MEMS or cMUTs) and thermoacoustic (using a laser to cause transient heating over a very small location and acoustic energy generated from the localized transient thermal related expansion).

Alternative, non-matrix approach to crosstalk reduction calculation:

The transfer function of the central transducer is measured by dividing (in the frequency domain) the pressure output generated by the associated electrical signal input. The observed pressure output from the adjacent element is also recorded. Thereafter, it is possible to determine a required electrical signal to be superimposed on the excitation of the adjacent element so as compensate for the cross talk in the following manner. The observed cross talk signal (measured or simulated)—in the frequency domain—is divided by the transducer transfer function as determined above. This calculation determines the electrical excitation that is required to give rise to the cross talk signal 'directly'—i.e. not via cross talk. If this calculated electrical signal (now in the time domain) is inverted and applied to the adjacent element, the direct transduced signal will essentially cancel the induced cross talk signal and substantially no net cross talk signal will emanate from the adjacent transducer element. The technique can be extended to the next adjacent element and so forth.

The technique has a recursive element to it in that the electrical signals applied to cancel the cross talk will themselves generate a small undesired cross talk signal. This second order effect will be largely insignificant where the cross talk is modest (e.g. less than −20 dB). If necessary, a recursive waveform design approach can be used to properly accommodate these second order cross talk effects. As an example, a Monte Carlo approach can be used wherein the shape of the excitation waveform is changed in a small way between runs until the best overall net cross talk effect is observed taking account of all second, and higher, order effects.

In an analogous manner, received acoustic waves on a central array element will give rise to small, delayed, substantially replica, signals on adjacent elements. Therefore, if the cross talk transfer function is known, the anticipated cross talk signal on the adjacent element can be subtracted to reveal, at least to a good approximation, the original desired cross talk free signal on the adjacent element.

The following products and services may benefit from the present invention: Medical Ultrasound Diagnostics; Non Destructive Examination—NDE, NDT; and High Frequency Sonar—Military and civil applications.

Exemplary advantages include the following, but are not limited thereto: Improved image quality—spatial resolution and contrast quality; Potentially, reduced cost; and potentially, improved reliability.

The following are exemplary embodiments of the present invention.

1. A method and/or system for reducing the impact of undesired inter element cross talk in the transmit mode in a diagnostic ultrasound array comprising the steps of:
a) calculating or measuring the cross talk effect from a first element to an adjacent second element;
b) applying a first chosen signal to a first element; and
c) applying a second chosen signal to a second element wherein the excitation to the second element is modified to take account of the calculated or measured cross talk effect.

2. A method and/or system for reducing the impact of undesired inter element cross talk in the transmit mode in a diagnostic ultrasound array comprising the steps of:
a) calculating or measuring the cross talk effect from a first element to an adjacent second element;
b) applying a first chosen signal to a first element;
c) applying a second chosen signal to a second element wherein the second signal comprises a component that has been added which is a filtered and delayed version of the first signal applied to the first element; and
d) wherein the filtering and delaying function is a function of the calculated, or measured, cross talk effect determined in step a).

3. A method and/or system for reducing the impact of undesired inter element cross talk in the receive mode in a diagnostic ultrasound array comprising the steps of:
a) calculating or measuring the cross talk effect from a first element to a second adjacent element;
b) receiving a first signal from a first element;
c) receiving a second signal from a second element;
d) modifying the response of the second element by applying a filter to the signal received by the first element and adding the filtered response of the first element to the response of the second element; and
e) wherein the filter is designed to reverse the cross talk effect measured in step a).

DETAILED DESCRIPTION OF THE INVENTION

Transmit Mode

Each array element is excited by an electrical waveform. Historically these waveforms were simple in form—impulses, steps or square wave bursts. However, the current state of the art is to use a programmable waveform. The major driving factor for this is the desire to reduce transmitted harmonic signals since it is now current practice to form the received signal image at the second harmonic of the transmitted signal since the second harmonic signal gives rise to a far higher quality image. This imaging technique is typically referred to as 'Tissue Harmonic Imaging'. The significance of the need to reduce the transmitted second harmonic is that it is preferable to program the shape of the transmitted waveform using some form of digital waveform encoding that is fed into a D->A converter prior to amplification. Patents describing this technique in detail include Cole U.S. Pat. No. 5,675,554 and Hossack U.S. Pat. No. 5,740,128. (both of which are hereby incorporated by reference herein in their entirety).

Figure 2:
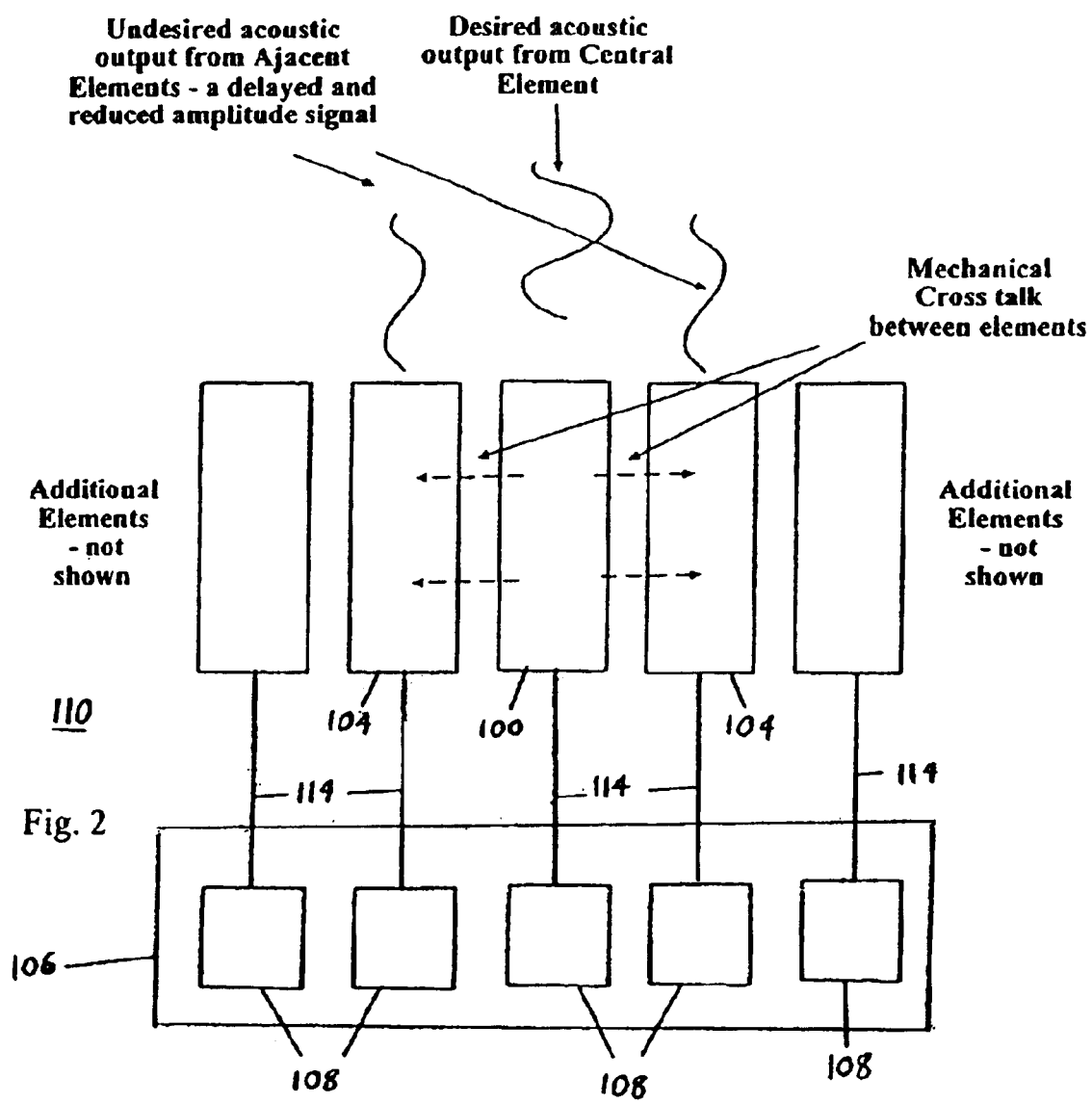
FIG. 2 is an outline of central array element, with the desired acoustic output propagating into tissue in one embodiment. Also shown are the delayed and reduced amplitude signals associated with acoustic cross talk and emanating from the adjacent elements.

FIG. 2 shows one system 110 for reducing the impact of inter element crosstalk in a transmit mode. The system 110 is a transmit beamformer 106 and associated transducer 112. Additional, different or fewer components may be provided, such as including a control processor or path connected with the transmit beamformer 106.

The transducer 112 is an array of piezoelectric or capacitive microelectro-mechanical ultrasound transducer (e.g., cMUT) elements 100, 104. For microelectromechanical arrays, each element 100, 104 includes a group of membranes excited with a same waveform. Different elements 100, 104 of the array may be excited with slightly different waveforms, such as a same waveform with different timing or waveforms with at least one different frequency or amplitude component. The array is a 1D, 1.25D, 1.5D, 1.75D, 2D, phased, linear, curved or other now known or later developed array.

The transmit beamformer 106 is a transmit beamformer as taught in U.S. Pat. Nos. 5,675,554 and 5,740,128, but other transmit beamformers with different, additional or fewer components may be used. These transmit beamformers 106 comprise primarily digital components with digital-to-analog converters. Analog transmit beamformers 106 may also be used.

The transmit beamformer 106 includes a plurality of transmit beamformer channels 114. The transmit beamformer channels 114 include components for generating transmit waveforms including waveform generators 108, delays, amplifiers, filters and other now known or later developed components. Each channel 114 connects with an element 100, 104 of the array. The connection is either permanent or switched, such as with a multiplexer. Transmit beamformer channels 114 are provided for each element 100, 104 of a transmit aperture. Each transmit beamformer channel 114 is operable to generate a signal or waveform for ultrasound imaging. For example, a one and half cycle Gaussian pulse is generated with characteristics adapted for propagation through tissue, reflection from tissue boundaries and reception of echoes for imaging. The imaging signals are delayed and apodized relative to each other for focusing along one or more scan lines. One or more of the transmit beamformer channels 114 also generates a signal for reducing crosstalk from other elements in addition to the signal for ultrasound imaging. For example, each transmit beamformer channel 114 generates a signal for reducing crosstalk from any adjacent or group of adjacent elements 100, 104.

Each waveform generator 108 is a memory for generating an entire desired waveform with both imaging and crosstalk reduction components, an envelope memory, an oscillator, a filter or other now known or later developed device for generating a square wave, sinusoidal or other signal at ultrasound frequencies. Each waveform generator 108 is operable to generate a first waveform having a first component to reduce crosstalk from a second waveform applied to another element, such as the waveform generated by the waveform generator of at least one adjacent element. The transmit beamformer channels 114 apply the waveforms to the elements substantially simultaneously, such as application pursuant to a delay profile for focusing the acoustic energy along a scan line in one transmit event. Since the waveforms are applied at a substantially same time, the component of one waveform adapted to reduce crosstalk will combine with the crosstalk, eliminating or reducing the amplitude of the crosstalk from the adjacent elements.

In one embodiment, each waveform generator 108 of each channel 114 generates a single waveform with both a component for reducing the effects of crosstalk from adjacent elements and another component for ultrasound imaging. In an alternative embodiment, each channel 114 includes multiple waveform generators 108 or allows for interleaved generation of waveforms with a same waveform generator 108. The crosstalk component is generated separately from the imaging component. The separately generated waveforms are then combined by one of application to the first element at appropriate timing to provide the desired overall waveform or application to a summer in the channel 114.

In yet another alternative embodiment, each channel 114 includes one or more filters and associated delays connected with adjacent channels 114. Each filter connects with the channel of another element. The waveform, such as the imaging waveform, is filtered by the filter. The passband or filter characteristic of the filter is selected as a function of the crosstalk response between the elements 100, 104. The filter may also invert the waveform or otherwise phase modify the waveform to make the waveform suitable for crosstalk reduction. Each delay delays the filtered waveform, such as to account for differences in focusing delay between channels 114 and to align the waveforms for reduction of crosstalk. The delayed and filtered waveform from one or more other channels 114 is then combined with the imaging waveform of the present channel 114 as the component to cancel or reduce crosstalk. The delay and filtering operation may also be combined into a single 'filtering' operation.

In a practical imaging system, a group of elements are fired with different delays applied to the excitation pulses to each element so as to form a focus at a particular point. In this case, the calculated signals to be applied to the 'adjacent' elements are superimposed (i.e. added) on to the waveform being used on that element to form the focused beam. This waveform addition may be performed in a digital domain and stored in the digital waveform memories of a multi-channel programmable waveform source—such as shown in U.S. Pat. No. 5,740,128. Alternatively, the waveforms for particular channels may be added in an analog domain for example using well known Operational Amplifier based voltage summers. The added or calculated signals reduce the crosstalk by canceling out some of the effects of crosstalk.

By removing or reducing crosstalk on transmission, a more desired waveform is transmitted. The resulting echoes have less noise or clutter due to sidelobes generated by crosstalk. Removal may also be used in the receive beamformer, such as by providing filters and delays responsive to crosstalk characteristics between elements. Signals form other elements are filtered, delayed and added to the received signals to reduce the effects of crosstalk on the receive operation. Reduction of crosstalk may be performed on just transmit mode, just receive mode or both modes.

The received signals are then processed to generate an image with less clutter due to crosstalk. This technique can be used in combination with now known or later developed diagnostic ultrasound imaging techniques. For example, the technique can be used for harmonic imaging modes (all harmonics—fractional, sub and super harmonics), with, and without, non-native contrast agents. The technique can be used with all forms of Doppler processing—velocity, energy, tissue, spectral (Pulsed Wave and Continuous Wave) and all combinations. As yet another example, the technique can be used for A-scans, B-scans and C-scans and also for 3D.

The above system implements a method for reducing the impact of inter element cross talk in a transmit mode of a diagnostic ultrasound array. A waveform is generated for each element. The waveforms include components operable to reduce crosstalk from application of other waveforms at other elements. As discussed above, the components for reducing crosstalk are generated with imaging waveforms as a single waveform, such as by modifying the desired imaging pulse to take account of crosstalk from one or more other elements. The components may alternatively be generated by filtering and delaying the desired imaging pulses from other channels 114 as a function of a crosstalk transfer function. In yet another alternative, the desired imaging pulse and any crosstalk reduction components are generated separately and combined. The two components are combined by applying both to the same element with desired relative timing or summing prior to application to the element.

Figure 4:
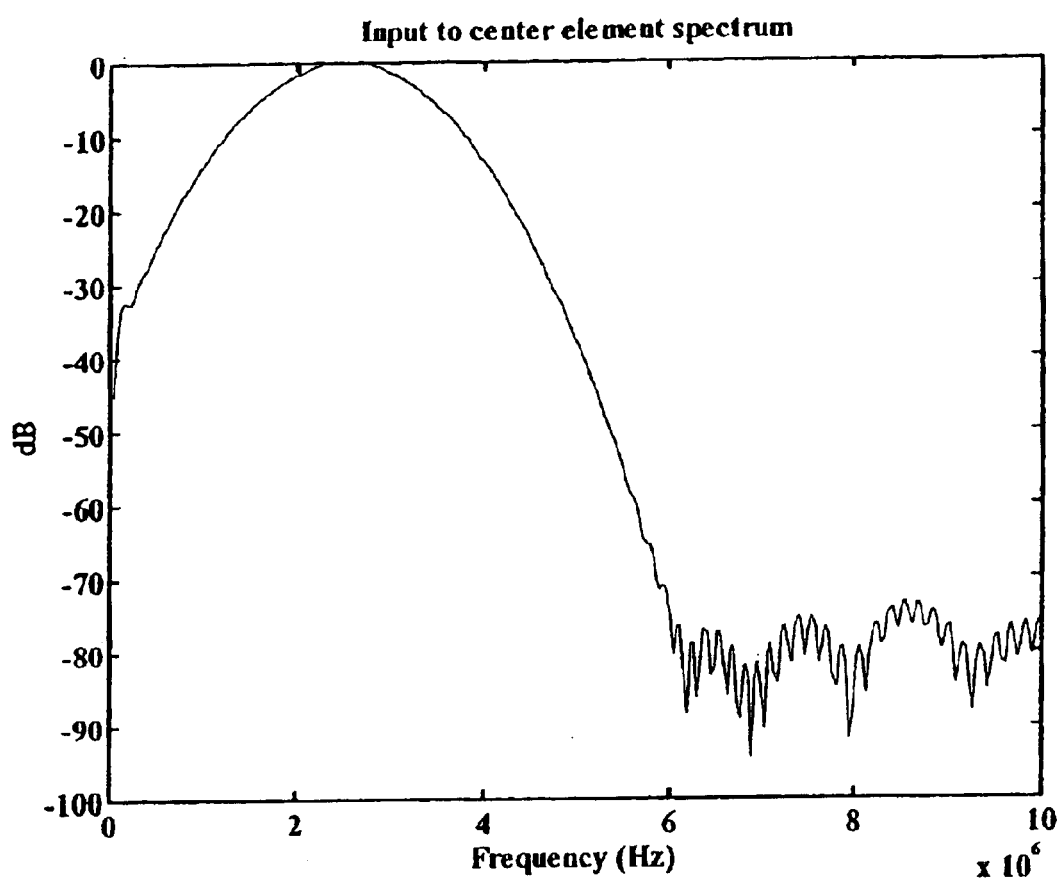
FIG. 4 is an embodiment of an input spectrum to center element.
Figure 5:
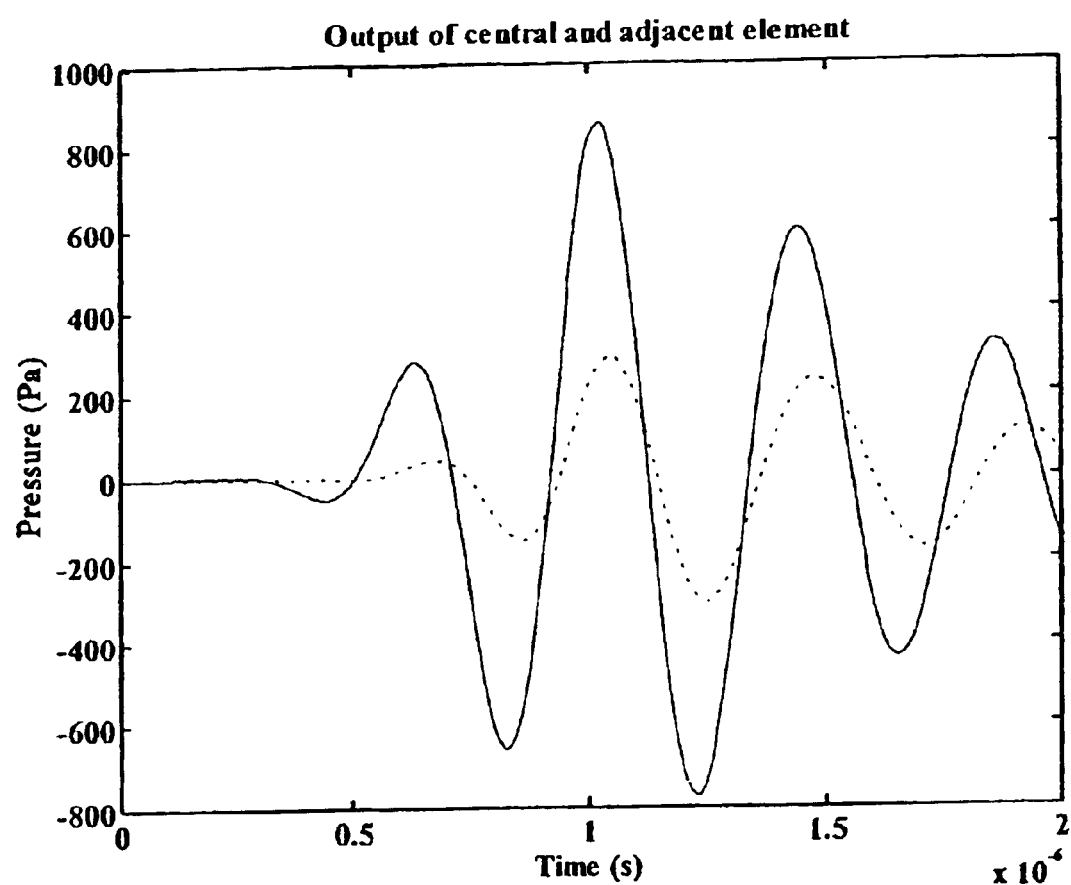
FIG. 5 shows pulse outputs from central (larger) and adjacent elements in one embodiment. The output from the adjacent element is smaller and delayed.
Figure 6:
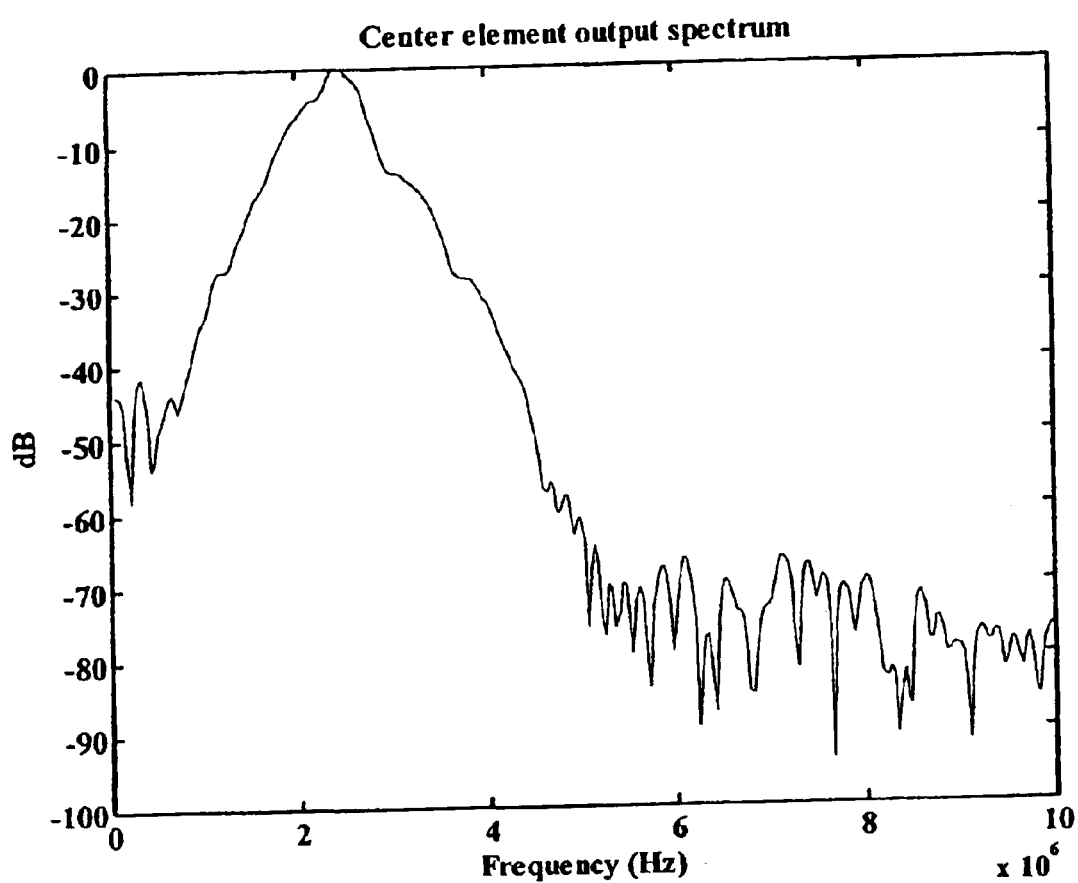
FIG. 6 is a spectrum of output of central element in one embodiment.
Figure 7:
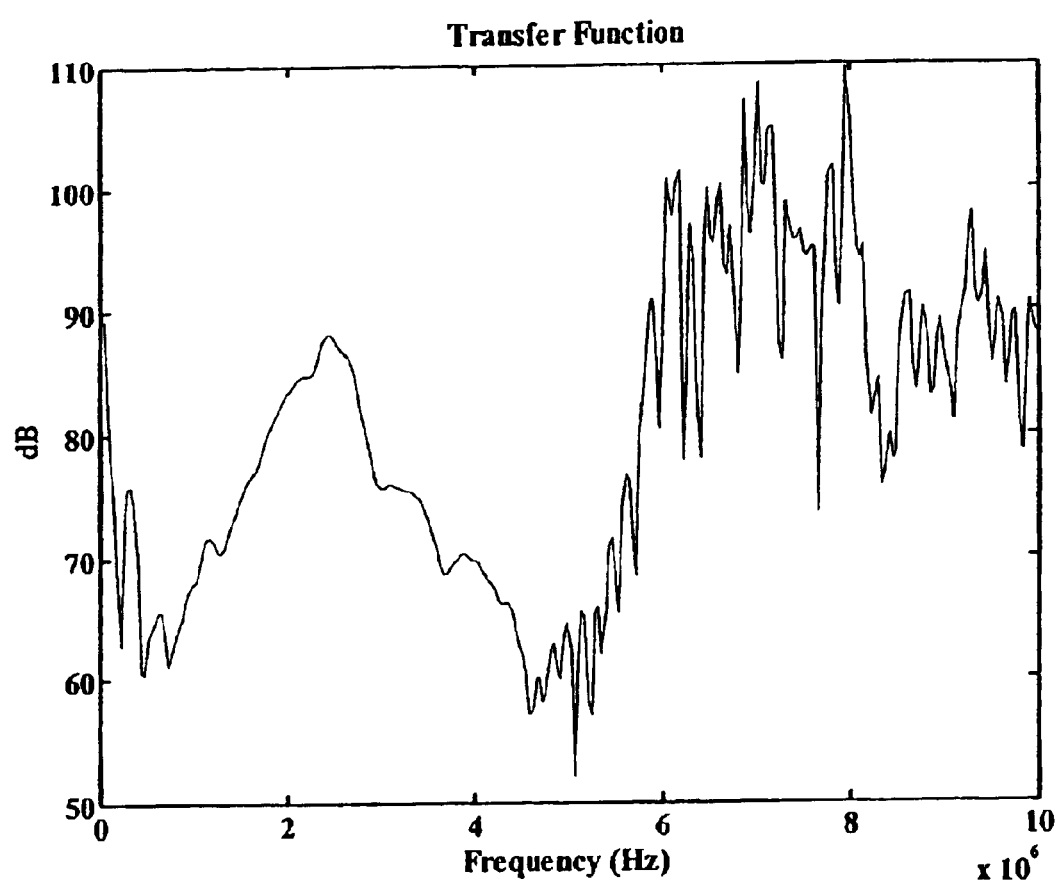
FIG. 7 is an example calculated Transfer Function.
Figure 8:
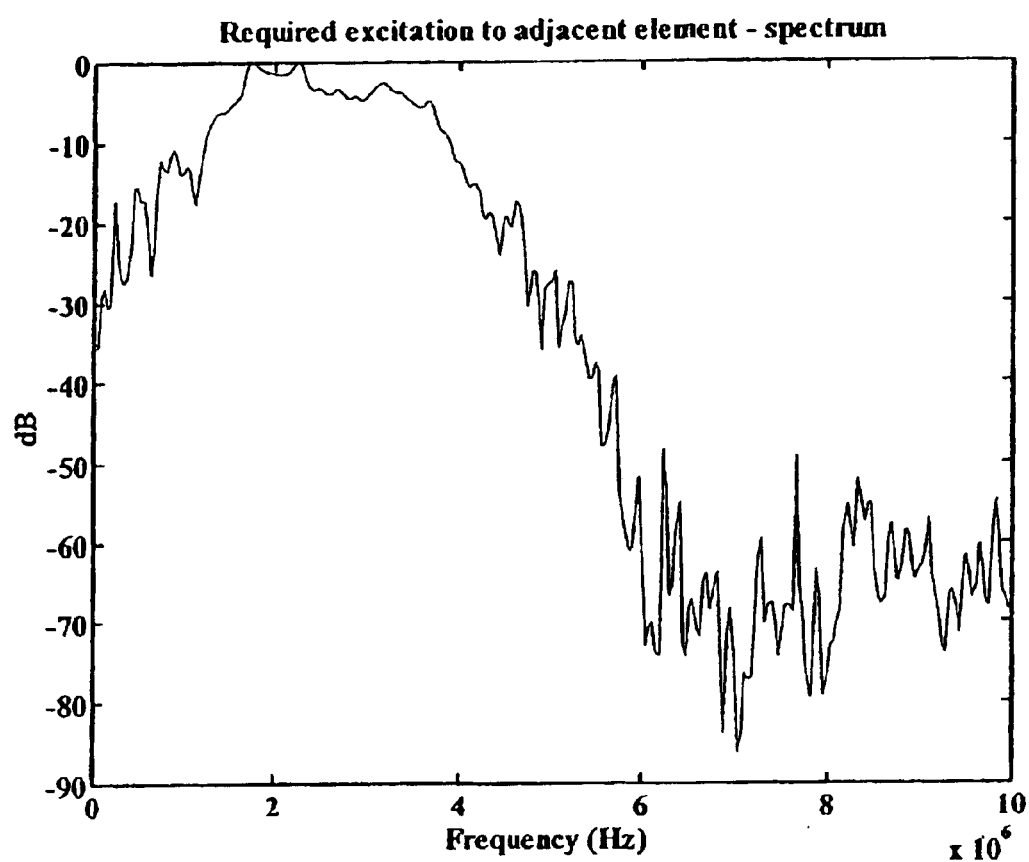
FIG. 8 is a spectrum of a cross talk cancellation component.
Figure 9:
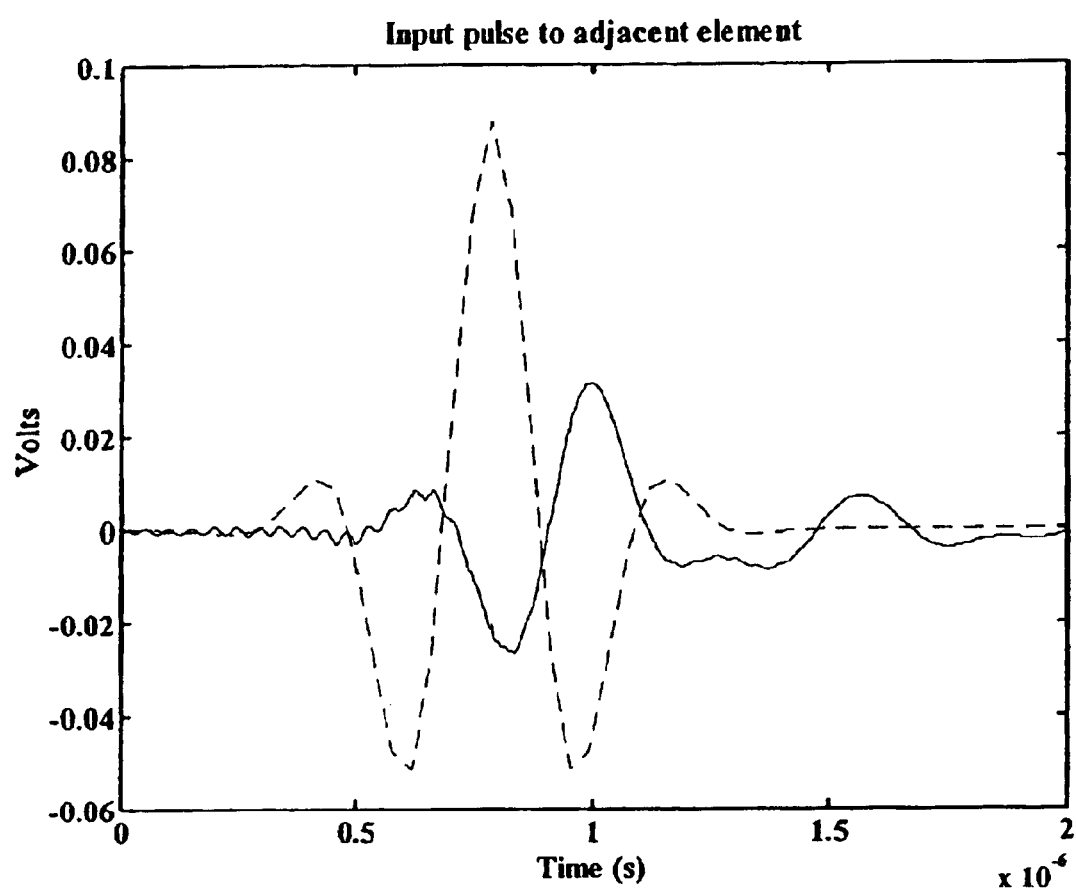
FIG. 9 shows one possible excitation (as a voltage pulse) to an adjacent element to compensate for cross talk (dashed line is original excitation to central element). As expected, the excitation to the adjacent element is delayed and smaller compared to the central element.

FIG. 4 shows the spectrum of a desired imaging signal or pulse for application to one or more elements. FIG. 5 shows the output (solid line) from an element of a time domain waveform corresponding to the spectrum of FIG. 4. The dashed line waveform of FIG. 5 shows the crosstalk pressure response from application of the same waveform to an adjacent element. The crosstalk pressure is delayed and has a smaller amplitude. FIG. 6 shows the spectral result of the desired waveform and the undesired crosstalk. FIG. 7 shows a calculated transfer function. The transfer function represents the difference in spectral response from the desired response of FIG. 4 due to the undesired crosstalk (i.e., the spectrum of FIG. 6 minus the spectrum of FIG. 4). FIG. 8 shows the a spectral response of a component waveform for reducing the effects of the crosstalk. FIG. 9 shows the imaging pulse or signal (dashed line) with the time domain waveform or component for canceling crosstalk from the adjacent element. The crosstalk reduction component is delayed and of smaller amplitude relative to the desired imaging pulse. The crosstalk reduction component is substantially an inverse waveform to the crosstalk generated on the element from the adjacent element.

Figure 10:
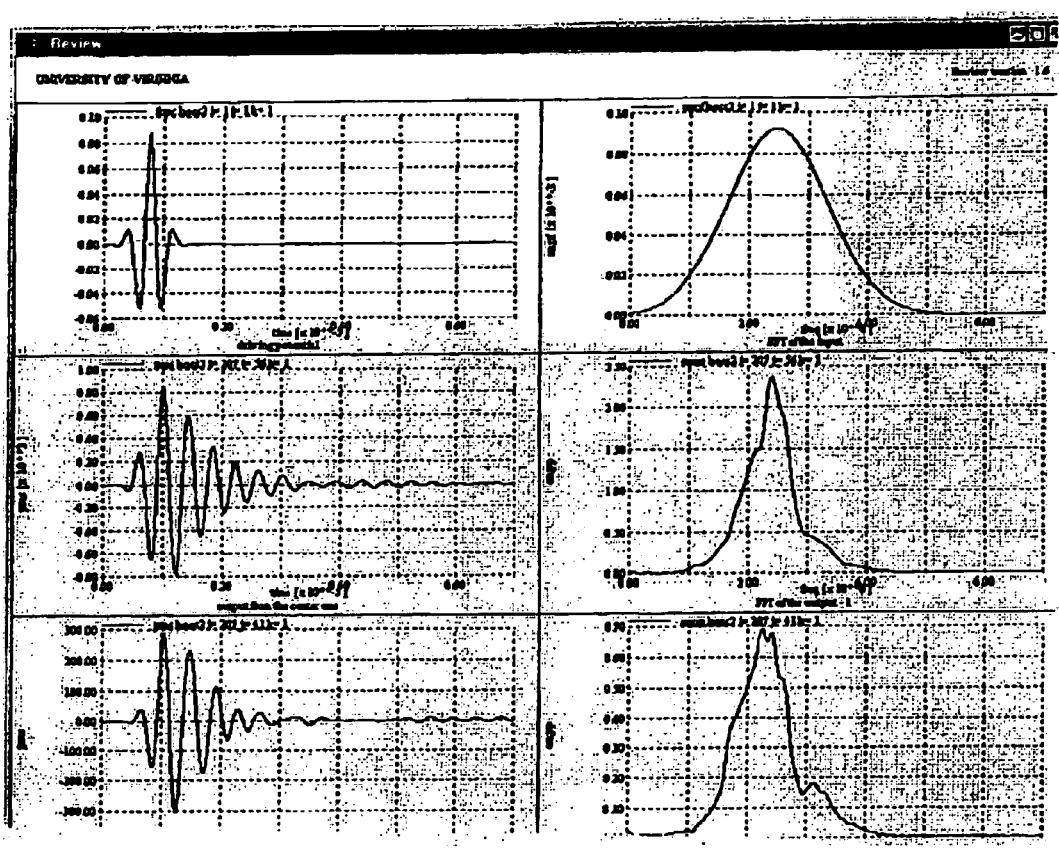
FIG. 10 is a PZFlex™ Finite Element Simulation—no compensation applied to adjacent element showing Input Gaussian Pulse; Input Pulse Spectrum; Output from center element—pulse; Output from center element—spectrum; Output from adjacent element—pulse; and Output from adjacent element—spectrum.
Figure 11:
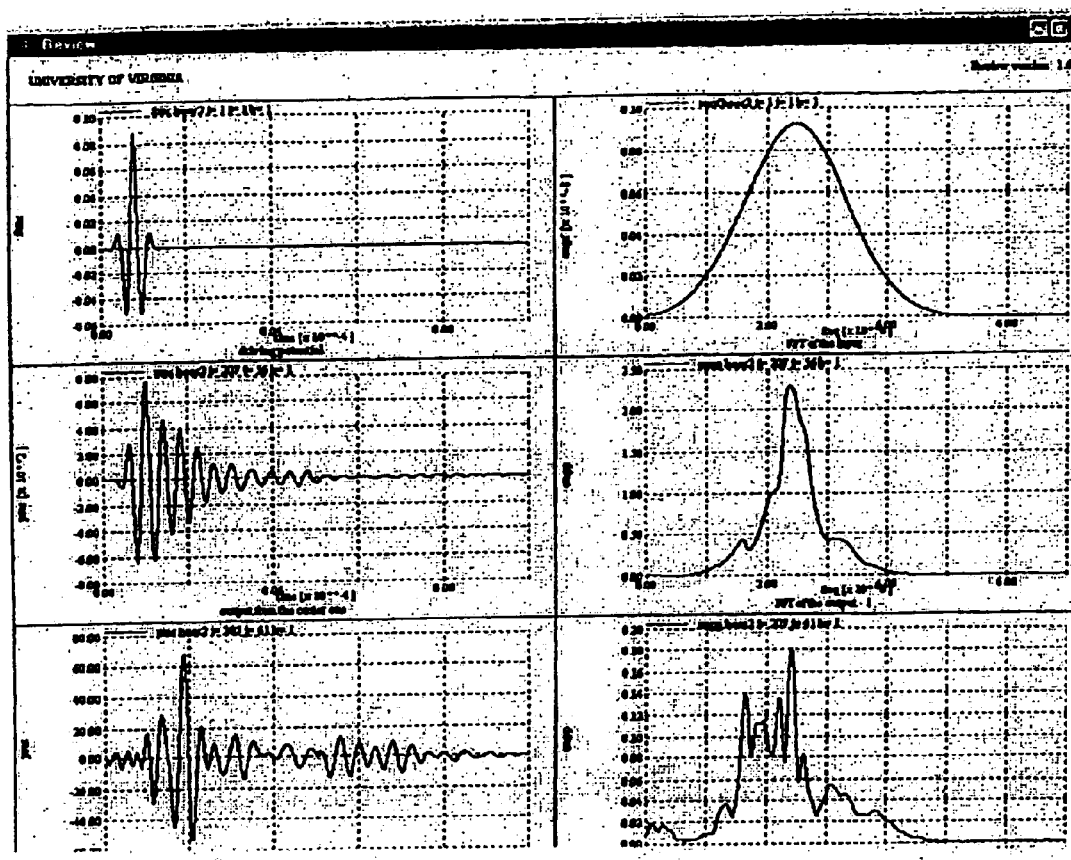
FIG. 11 is a PZFlex™ Finite Element Simulations—after compensation applied to adjacent element showing Input Gaussian Pulse; Input Pulse Spectrum; Output from center element—pulse; Output from center element—spectrum; Output from adjacent element—pulse; and Output from adjacent element—spectrum—Note much smaller signal than for no compensation case.

As further examples, FIGS. 10 and 11 show simulated crosstalk. FIG. 10 shows an input Gaussian pulse and the associated spectrum applied to an element. The output of the element and the associated spectrum are also shown. Due to the oscillation created in the element, the ringdown time of the input waveform is extended. The crosstalk generated at an adjacent element and the associated spectrum is also shown. FIG. 11 shows the same information, but with the component to reduce crosstalk added with the crosstalk at the adjacent element. The pressure scale for the cross talk is much lower. The output waveform of the primary element (e.g., center element) is different in FIGS. 10 and 11 since the crosstalk cancellation signal causes the output of the central element to change slightly since the cancellation signal is couple back to the primary element. In alternative embodiments, the cancellation or crosstalk reduction component is added to the waveform of one element to reduce the crosstalk at a different element, such as adding the component to the Gaussian pulse shown in FIGS. 10 and 11.

Desired imaging pulses, such as the Gaussian pulses shown in FIGS. 10 and 11, are applied to each element in the transmit aperture. Any components for reducing crosstalk from adjacent or other elements are also applied. The waveforms having both the desired imaging pulse and the crosstalk reduction pulse are applied to all the elements substantially simultaneously. Substantially is used to account for the relative delays between channels 114 for focusing as well as delays in the crosstalk component to account for propagation of the crosstalk energy between elements. The crosstalk component is operable to reduce the crosstalk from all elements, a subset of elements, adjacent elements or groups of adjacent elements.

A similar process is used for reducing the impact of inter element crosstalk in a receive mode in a diagnostic ultrasound array. Echo signals are received at each element across a receive aperture of the array. To reduce the crosstalk from reception of echo signals at other elements, the received signals are modified as a function of the crosstalk characteristic between the elements. For example, the received signal at one element is filtered as a function of a crosstalk characteristic, such as a crosstalk transfer function between the elements. The filtered signal represents an inverse of the likely crosstalk component at another element. The filtered signal is then added to the received echo signal at the other element, reducing the effects of any crosstalk.

The crosstalk transfer function or effects of the crosstalk are measured or calculated as discussed below.

Figure 1:
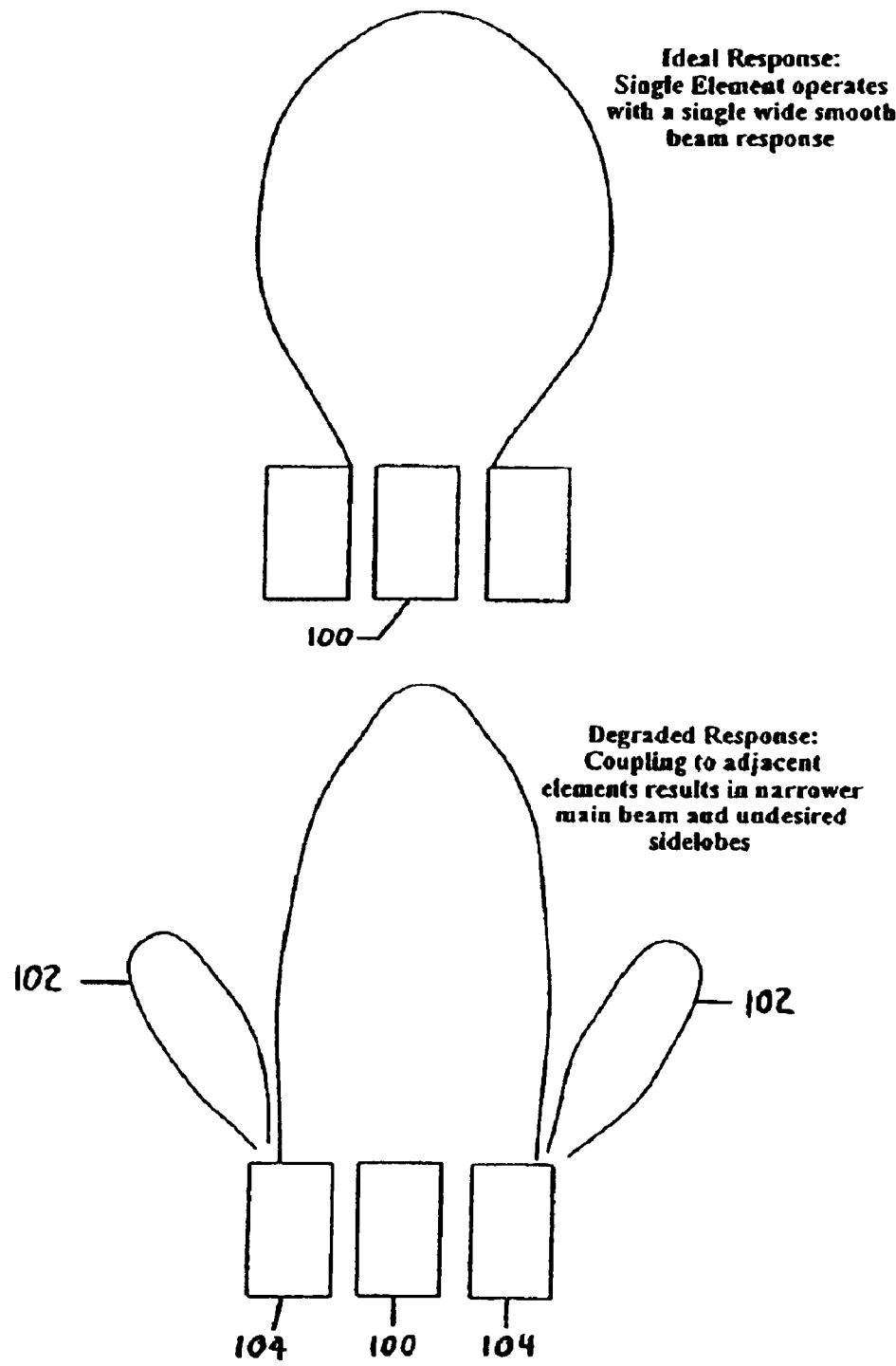
FIG. 1 is an illustration of ideal single element response and degraded element response due to cross talk in one embodiment.

Referring to FIG. 1, as a central array element 100 is excited by its associated waveform generating channel, a smaller signal 102 is generate from its adjacent elements 104. The cross talk signal may be in the range (for example)–20 dB to –40 dB in amplitude with respect to the central array element and is delayed by some fraction of a microsecond. The actual output of the adjacent element can be measured using a needle hydrophone or estimated using a complex transducer model for the transducer design in use. PZFlex Finite Element Analysis is a well known method for comprehensive transducer modeling suitable for predicting the cross talk signal.

'Central' and 'adjacent' are used for convenience. The technique is applicable to any or all array elements except the end elements for which there is no 'adjacent' element on the outer edge. The 'central' element 100 is the primary desired element being driven (first order effect). The adjacent element 104 vibrates—in addition to the vibration due to its own primary (1St. order) voltage drive, according to a second order effect that is due to primary effect on its neighbor—the central element. FIG. 2 shows another representation of the this undesired cross talk.

The function of the array can be described by a transfer function matrix relating input electrical excitations of one or more elements to measured output pressure responses at multiple measurement points in the field. Generally, these measurement points are very close to the transducer so that the crosstalk component can be more easily distinguished from diffracted components from adjacent elements. (i.e. in the very near field, the output of the adjacent element is measured in isolation from diffracted components from neighbors).

Figure 3:
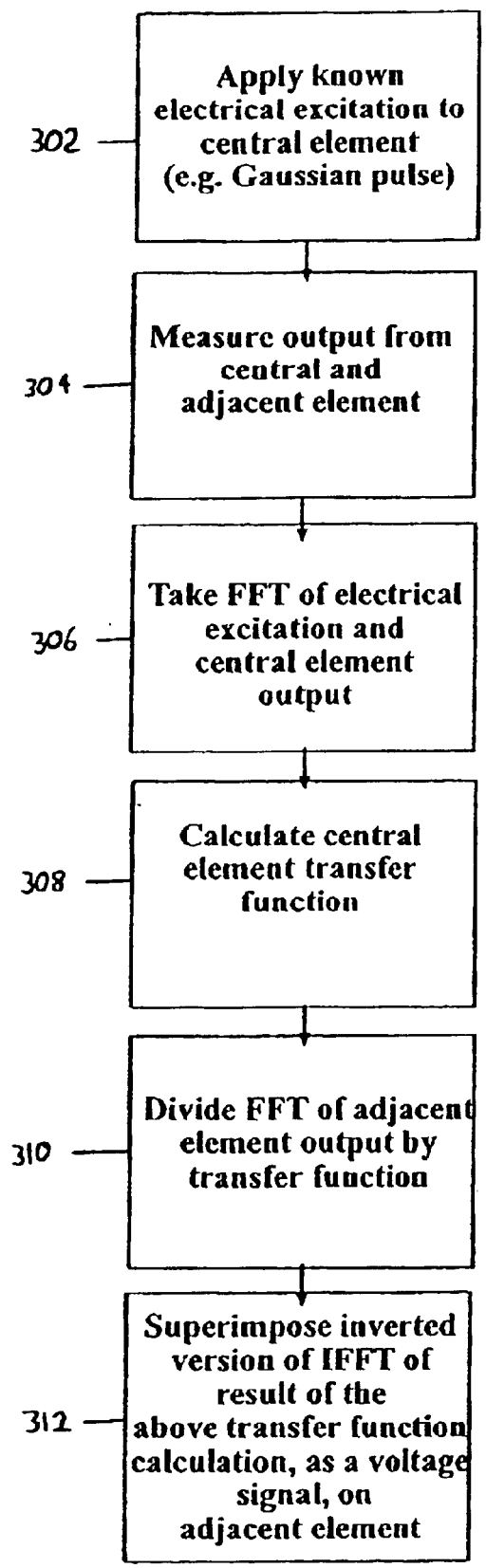
FIG. 3 is a block diagram of one embodiment of a process for determining electrical excitation of adjacent elements.

Generally, the initial case has a single element being excited as shown at act 302 in FIG. 3. The output of neighboring elements is desired to be as close to zero as possible. This condition is satisfied when there is no array crosstalk or crosstalk has been adequately suppressed or cancelled. After applying a known excitation to the central element 100, the output at the central element 100 and adjacent elements 104 are measured in act 304. In act 306, a fast Fourier transform is performed on the electrical excitation applied to the central element in act 302 as well as the output of the central element measured in act 304. In act 308, the central element transfer function is calculated from the transformed information. The transfer function is the ratio of output pressure waveform (in the frequency domain) to input electrical signal (in the frequency domain). In act 310, the fast Fourier transform of the measured signal at the adjacent element is divided by the transfer function calculated in act 308. In act 312, the result of act 310 is inverted. The signal is converted to the time domain via inverse Fourier transform, inverted to produce the quantity which when added to the original crosstalk sums to zero, and then converted back to the frequency domain. However, as a practical matter, in act 312, the result of act 310 may be inverted directly in the frequency domain—i.e. phase rotated by 180 degrees at every frequency sample. The result of act 312 is then divided by the transducer transfer function to determine the first order approximation to the required additional electrical stimulation to the adjacent element to cause crosstalk cancellation. The result of this division is then converted back to the time domain via an inverse Fourier transform and is then superimposed on the signal applied to the adjacent element to result in reduced crosstalk.

The above process demonstrates one example of determining a crosstalk characteristic from one element to another second element where the elements are adjacent to each other in the array. The same process may be used for non-adjacent elements. The crosstalk characteristic in the process of FIG. 3 relies on measuring the crosstalk. Alternatively, the crosstalk is modeled or calculated. The crosstalk reduction component is generated as a function of a characteristic of the crosstalk, such as the amplitude, delay and frequency of the crosstalk.

Figure 13:
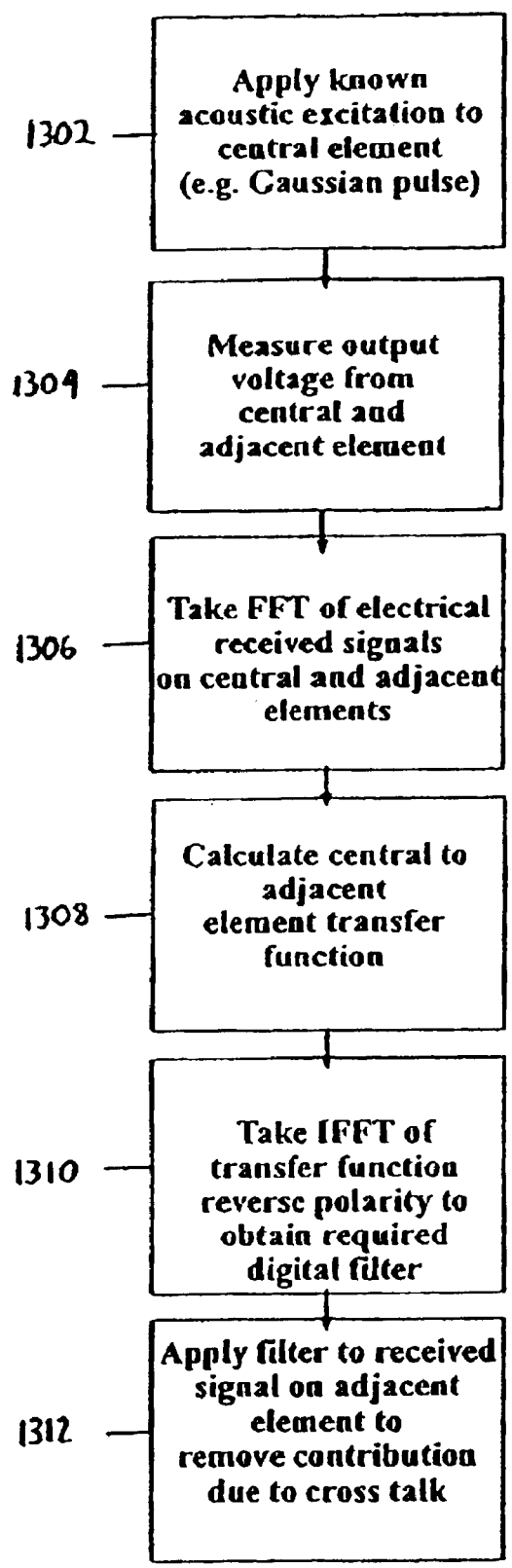
FIG. 13 is a block diagram of one embodiment indicating the process by which the filter to be applied to the adjacent element signal is derived so as to remove the contribution due to undesired cross talk.

FIG. 13 shows a process similar to FIG. 3 where a filter response is determined as a function of the crosstalk characteristic. The example of FIG. 13 is for a receive mode filter, but the process may be altered for application to a transmit mode filter by using transmitted signals. In act 1302, a known acoustic excitation is applied to a central element and a responsive echo signal is received. Alternatively, a likely receive signal is applied to the central element. In act 1304, the output voltage from the central and an adjacent element responsive to act 1302 is measured. The outputs voltage is the received signal generated in response to transmission using the known excitation. Alternatively, the output is calculated or simulated. In act 1306, a fast Fourier transform is performed on the electrical received signals on the central element and adjacent elements measured in act 1304. In act 1308, the central element to adjacent element transfer function is calculated from the transformed information. This central element to adjacent element transfer function is calculated by dividing the electrical output from the adjacent element (in frequency domain) by the pressure wave input to the central element (in frequency domain). The 'inversion' act may occur in one of several places. In act 1310, the transfer function calculated in act 1308 is inverse fast Fourier transformed. The polarity of the transfer function is reversed either prior to or after the inverse transform. The result represents the desired filter response for reducing crosstalk. In act 1312, a received signal used for imaging is applied to a filter programmed with the desired filter response. For example, a received signal from the adjacent element is applied to the filter. The filtered output is added to the received signal at the center element to reduce any crosstalk. This process may be repeated for designing the filters of additional, all or a subset of elements of the receive aperture. Multiple filters may be used for any given channel to reduce crosstalk from a plurality of elements in any given element.

For either the transmit or receive modes, the measurements are performed for every element. Alternatively, the symmetry of the array is used. In one embodiment, a banded matrix is populated as function of the crosstalk characteristic measured at one, two or other subset of elements. The resulting banded matrix is used to determine the component waveform for reducing crosstalk at each element due to transmit or receive signals at one or more other elements.

Beamforming generally starts by assuming that each element is operating independently and that the total field energy is derived from a linear summation of contributions from all elements taking account of diffraction and attenuation effects. However, cross-talk occurs so that a cross-talk signal is measured in act 304. Thus, by solving the crosstalk problem for the case of a single element, then the excitations and their associated crosstalk cancellation signals are superimposed so as to achieve the required beamforming effect, reduction or elimination of cross talk across the array. The beamforming task is separate from the crosstalk cancellation task. The beamforming may require nonlinear analysis when the sound intensities are finite. This is commonly the case in harmonic imaging (imaging at the second harmonic of the transmit signal from either tissue or contrast agent bubbles).

Even in this case, the beamforming process at the array elements is considered in a linear fashion—i.e. that all element contributions can be considered in isolation and then added when the nonlinear calculation is required. Typically, the nonlinear component is practically zero immediately adjacent to the transducer since the harmonic signal accumulates as the wave passes through the media in front of the array.

The transfer function is most easily analyzed as an impulse response function in the frequency domain. Therefore, in measurements and simulations, the time domain responses, H(t), is measured, and then converted to the frequency domain counterparts, H(f), using a Fourier transform. Conversely, once a required excitation is defined in the frequency domain, the time domain equivalent is calculated via an inverse Fourier transform.

Figure 14:
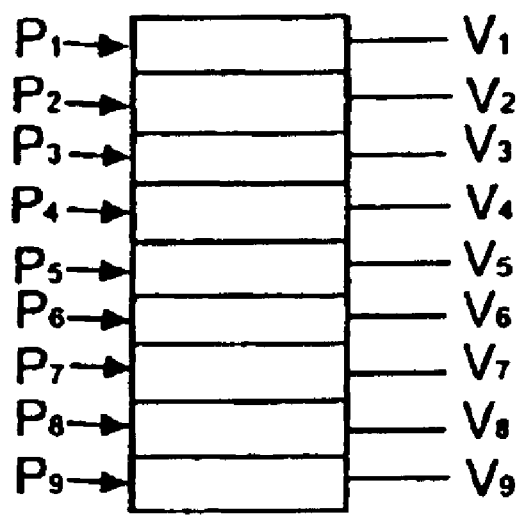
FIG. 14 is an illustration of a 9 element array with 9 field measurement points.

The pressure output, $P_i$, from the $i^{th}$ element can be represented using the following matrix equation (Equation 1) where H (abbreviated from H(f) is the transfer function matrix relating input voltages, $V_i$, to the output pressures, $P_i$. This example is for a 9 element array such as shown in FIG. 14, but may be expanded as required. An impulse is applied to the center element so that $V_5$ is an impulse (all 1's in the frequency domain). $V_1$ to $V_4$ and $V_6$ to $V_9$ are zero. $P_5$ is the direct output from the 5th element. However, since some of the non diagonal terms in the H matrix are non zero, there will be finite output from the other elements—i.e. some of $P_1$ to $P_4$ and $P_6$ to $P_9$ may be non zero. Once the matrix H is defined, the matrix problem is solved to find values for $V_1$ to $V_9$ such that the desired output—i.e. $P_1$ to $P_4$=0, $P_5$=ideal impulse response of the 5th element and $P_6$ to $P_9$=0 results or such that at least some cross talk is reduced for one or more elements.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & H_{13} & H_{14} & H_{15} & H_{16} & H_{17} & H_{18} & H_{19} \\ H_{21} & H_{22} & H_{23} & H_{24} & H_{25} & H_{26} & H_{27} & H_{28} & H_{29} \\ H_{31} & H_{32} & H_{33} & H_{34} & H_{35} & H_{36} & H_{37} & H_{38} & H_{39} \\ H_{41} & H_{42} & H_{43} & H_{44} & H_{45} & H_{46} & H_{47} & H_{48} & H_{49} \\ H_{51} & H_{52} & H_{53} & H_{54} & H_{55} & H_{56} & H_{57} & H_{58} & H_{59} \\ H_{61} & H_{62} & H_{63} & H_{64} & H_{65} & H_{66} & H_{67} & H_{68} & H_{69} \\ H_{71} & H_{72} & H_{73} & H_{74} & H_{75} & H_{76} & H_{77} & H_{78} & H_{79} \\ H_{81} & H_{82} & H_{83} & H_{84} & H_{85} & H_{86} & H_{87} & H_{88} & H_{89} \\ H_{91} & H_{92} & H_{93} & H_{94} & H_{95} & H_{96} & H_{97} & H_{98} & H_{99} \end{bmatrix} \begin{bmatrix} V_1 \\ V_2 \\ V_3 \\ V_4 \\ V_5 \\ V_6 \\ V_7 \\ V_8 \\ V_9 \end{bmatrix} \quad (1)$$

In fact, cross coupling may only be significant on a few neighboring elements. In the case below, cross coupling is limited to two elements on each side of the element being excited. The matrix becomes a banded matrix with band width 5. All other values of H are 0. This simplifies the characterization of the H matrix and allows for a more efficient matrix solution.

Notice that there is significant symmetry in the matrix. The crosscoupling (crosstalk) from array element 3 to array element 4 may be the same as from array element 4 to array element 5—and so on. There might be some irregular behavior at the ends of the array due to different boundary conditions. However, even in this case, the change in crosstalk may be modest since it is common practice to have one or two 'dummy' elements that are used during manufacture to ensure alignment of the saw blade with the required kerf before dicing the 'real' elements. For the matrix shown below, the crosstalk function of the two adjacent elements resulting from impulse excitation of a central element is measured without measuring at other elements. Thereafter, using the 'direct' output from the central element and the crosstalk measurements, the banded matrix is populated.

For example, $V_5$=1 (impulse excitation) and $V_1$ to $V_4$ and $V_6$ to $V_9$=0. $H_{55}$ is defined by the 'direct' output $P_5$. $H_{54}$ and $H_{56}$ are defined by the output on the neighboring element. $H_{53}$ and $H_{57}$ are defined by the output on the second neighboring element. Thereafter, the symmetry of the matrix is used to completely populate the banded matrix, providing cancellation wave forms for each element $V_1$–$V_9$.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & H_{13} & 0 & 0 & 0 & 0 & 0 & 0 \\ H_{21} & H_{22} & H_{23} & H_{24} & 0 & 0 & 0 & 0 & 0 \\ H_{31} & H_{32} & H_{33} & H_{34} & H_{35} & 0 & 0 & 0 & 0 \\ 0 & H_{42} & H_{43} & H_{44} & H_{45} & H_{46} & 0 & 0 & 0 \\ 0 & 0 & H_{53} & H_{54} & H_{55} & H_{56} & H_{57} & 0 & 0 \\ 0 & 0 & 0 & H_{64} & H_{65} & H_{66} & H_{67} & H_{68} & 0 \\ 0 & 0 & 0 & 0 & H_{75} & H_{76} & H_{77} & H_{78} & H_{79} \\ 0 & 0 & 0 & 0 & 0 & H_{86} & H_{87} & H_{88} & H_{89} \\ 0 & 0 & 0 & 0 & 0 & 0 & H_{97} & H_{98} & H_{99} \end{bmatrix} \begin{bmatrix} V_1 \\ V_2 \\ V_3 \\ V_4 \\ V_5 \\ V_6 \\ V_7 \\ V_8 \\ V_9 \end{bmatrix} \quad (2)$$

The impulse responses can be measured experimentally using a small hydrophone placed close to each element in a water bath. Suitable hydrophones are needle PVDF hydrophones or the 'Golden Lipstick' from Onda Corp., Sunnyvale, Calif. Alternatively, a prediction of the direct transfer function and crosstalk can be made using a suitable computer model—such as using PZFlex Finite Element Software (WAI, Los Altos, Calif.) or ANSYS (ANSYS Inc., Canonsburg, Pa.). Frequently the true impulse response is not calculated due to the practical difficulty of modeling a true impulse. A more practical approach is to use a square wave excitation (or similar finite short pulse) of sufficiently high bandwidth to produce a relatively unfiltered response. The output response (in the frequency domain) can be divided by the frequency domain representation of the excitation pulse to derive the impulse response.

The matrix solution can be performed in any of a number of ways. One approach to the solution is Gaussian elimination. Another approach is to use the matrix solution command in Matlab (the '\' command, or 'mldivide').

Figure 15:
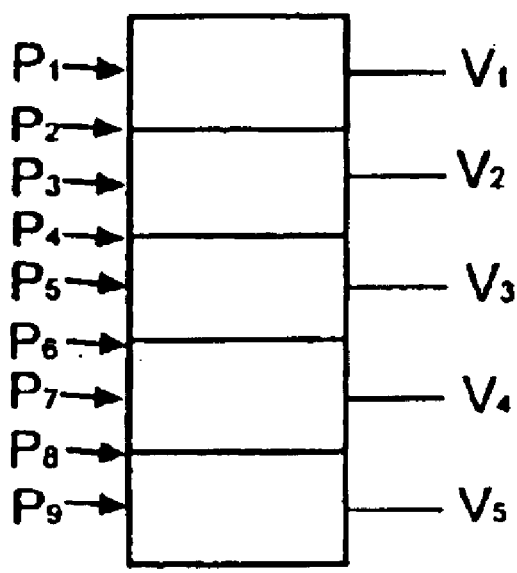
FIG. 15 is an illustration of a 5 element array with 5 field measurement points.

The approach can be extended to an over constrained case. For example, field sample points may be placed closer together in the field than that corresponding to array element spacing. For example, one field sample point may be placed between array element centers. For example, 5 array elements and 9 field measurement points are used. FIG. 15 illustrates this configuration. There are 5 field points lying adjacent to the array element centers and 4 points lying intermediate between these 5 field points. In this case we have more defined 'output' conditions than defined 'inputs'. Thus, the problem is over constrained and needs a pseudo-inverse solution. A best fitting solution is found by a least squares analysis. The Matlab 'pinv' command implements this operation in an efficient and easy to use manner.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & H_{13} & H_{14} & H_{15} \\ H_{21} & H_{22} & H_{23} & H_{24} & H_{25} \\ H_{31} & H_{32} & H_{33} & H_{34} & H_{35} \\ H_{41} & H_{42} & H_{43} & H_{44} & H_{45} \\ H_{51} & H_{52} & H_{53} & H_{54} & H_{55} \\ H_{61} & H_{62} & H_{63} & H_{64} & H_{65} \\ H_{71} & H_{72} & H_{73} & H_{74} & H_{75} \\ H_{81} & H_{82} & H_{83} & H_{84} & H_{85} \\ H_{91} & H_{92} & H_{93} & H_{94} & H_{95} \end{bmatrix} \begin{bmatrix} V_1 \\ V_2 \\ V_3 \\ V_4 \\ V_5 \end{bmatrix} \quad (3)$$

In this case, the matrix may also be banded due to finite crosstalk. In the following example, crosstalk is limited to the first neighboring element. Again, the values of H can be derived either experimentally or using a computer model. As before, once a small number of crosstalk measurements are made, the matrix can be fully populated by using the symmetry of the system.

$$\begin{bmatrix} P_1 \\ P_2 \\ P_3 \\ P_4 \\ P_5 \\ P_6 \\ P_7 \\ P_8 \\ P_9 \end{bmatrix} = \begin{bmatrix} H_{11} & H_{12} & 0 & 0 & 0 \\ H_{21} & H_{22} & 0 & 0 & 0 \\ H_{31} & H_{32} & H_{33} & 0 & 0 \\ 0 & H_{42} & H_{43} & 0 & 0 \\ 0 & H_{52} & H_{53} & H_{54} & 0 \\ 0 & 0 & H_{63} & H_{64} & 0 \\ 0 & 0 & H_{73} & H_{74} & H_{75} \\ 0 & 0 & 0 & H_{84} & H_{85} \\ 0 & 0 & 0 & H_{94} & H_{95} \end{bmatrix} \begin{bmatrix} V_1 \\ V_2 \\ V_3 \\ V_4 \\ V_5 \end{bmatrix} \quad (4)$$

In the above two matrix problems, a least squares best fitting solution for finding the required excitations of V1 to V5 to produce finite output on only one selected element is found using a pseudoinverse operation on matrix H.

If a parasitic crosstalk wave is eliminated in either transmit or receive, then generally that is sufficient. If the sidelobe resulting from crosstalk is eliminated in either transmit or receive, then that sidelobe may be 'invisible' or have minimal undesired effect in a pulse echo operation.

Receive Mode

The above technique can also be used in the receive mode. The correction involves (to first order) subtraction of scaled and delayed representations of adjacent element signals from the first element's signal.

Received acoustic waves on a central array element will give rise to small, delayed, substantially replica, signals on adjacent elements. Therefore, if the cross talk transfer function is known, the anticipated cross talk signal on the adjacent element can be subtracted to reveal, at least to a good approximation, the original desired cross talk free signal on the adjacent element.

Figure 12:
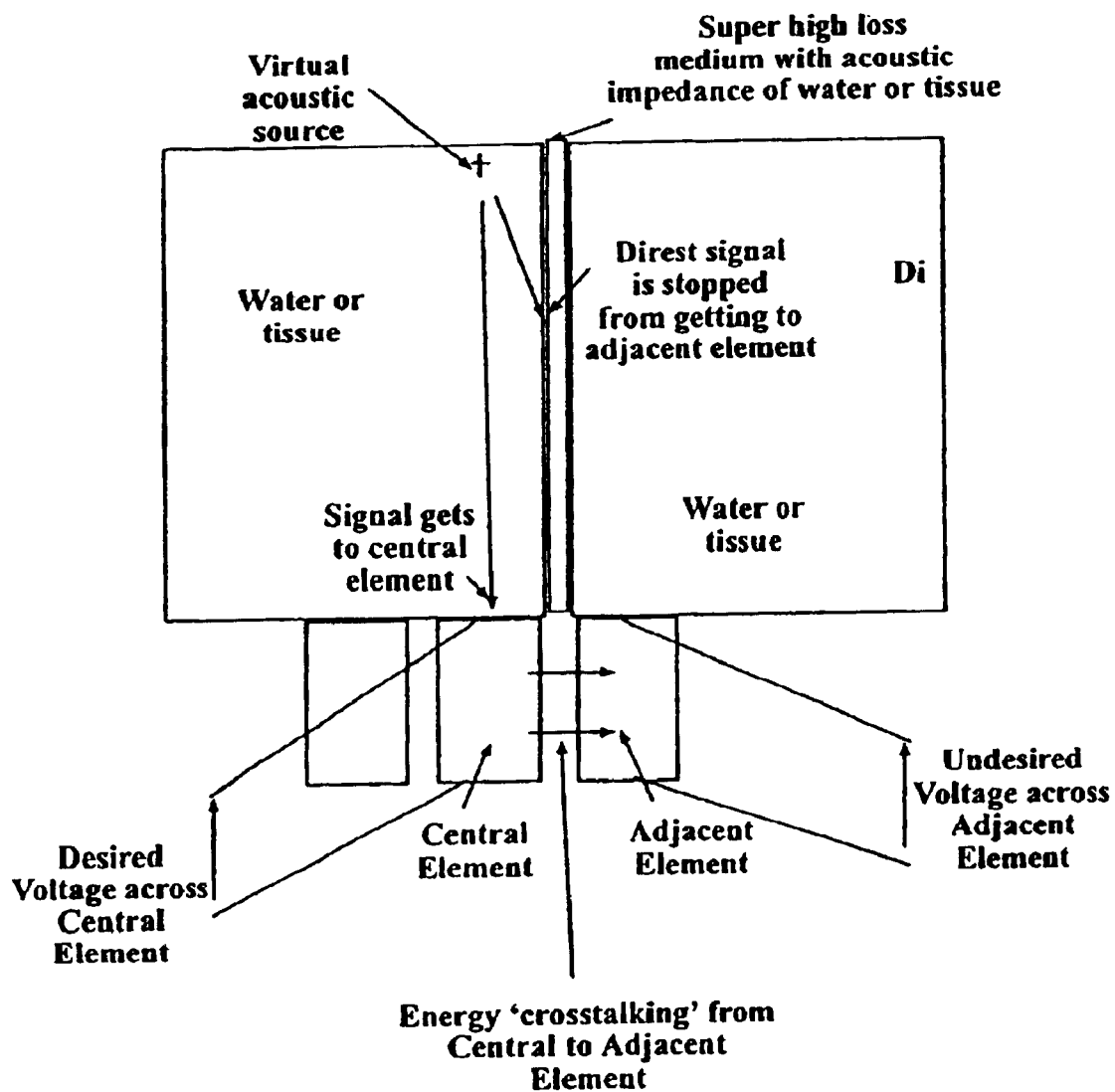
FIG. 12 is one embodiment of a configuration for simulating the cross talk only component from a central element to an adjacent element in receive. Note the high loss, matched, layer dividing the propagation medium so that the adjacent element does not receive a 'direct' signal and that the only signal detected is the cross talk signal.

In the receive mode, the transfer function relating the echo received on the adjacent element to the echo received on the central element is calculated. In a practical situation, the 'real' signal on the adjacent element is compounded with the unwanted cross talk signal from the central element. Therefore, this calculation of transfer function is best performed using a detailed simulation—e.g. PZFlex finite element analysis (Weidlinger Associates Inc. Los Altos, Calif.). In this simulation, the artificial constraint is applied that the input pressure function is received by the central element but not by the adjacent element. This may be realized by dividing the acoustic medium through which the source pressure function is propagating into two with an extremely high loss, acoustically matched, medium as a dividing layer down the model to prevent any 'real' input being received by the adjacent element. FIG. 12 shows this configuration. This model produces the desired acoustic output from the central element (time domain) and the undesired cross talk signal on the adjacent element (also time domain). The FAT of both of these functions is calculated and the response (frequency domain) of the adjacent element divided by the response (frequency domain) of the central element. This defines the transfer function of the cross talk energy (frequency domain). A digital filter that calculates the signal to be added to adjacent element so as to cancel just the cross talk signal may be found by taking the IFFT of the transfer function and applying a change of sign—i.e. a negative prefix to the digital filter coefficients. Thereafter, in a practical system, the cross talk response may be removed by convolving this filter with the signal from the central element and adding it to the response of the adjacent element to yield the cross talk free adjacent element signal. This determination is repeated for each element in the receive aperture.

Of course, for reasons of economy, a more simplistic approach may be desired. As one example, a scaled (up or down) and delayed and/or phased replica of the center element response is added, or subtracted, from the response of the adjacent element to yield an approximate cross talk free response for the adjacent element.

This derivation solves only for the first order correction. In practice, the second order effects, such as the cross talk effect of the adjacent element onto the central element—before the signal to be input to the cross talk compensating filter—has not been accounted for. The basic technique can be extended to take account of these second (and higher) cross talk effects by more complex analysis—including, for example, a Monte Carlo approach to finding the required filter coefficients that properly remove the first, second and higher cross talk effects. In practice, it is believed that the first order correction described herein is sufficient.

Variations

The method is particularly well suited to use with transducers that have inherently high levels of cross talk. In particular, silicon MEMS transducers, typically exhibit significant cross talk. These MEMS transducers are described in detail in the patents by Khuri-Yakub et al. These patents (listed below) are hereby incorporated by reference herein in their entirety:

1. U.S. Pat. No. 5,619,476 'Electrostatic ultrasonic transducer'

2. U.S. Pat. No. 5,870,351 'Broadband microfabricated ultrasonic transducer and method of fabrication'

3. U.S. Pat. No. 5,894,452 'Microfabricated ultrasonic immersion transducer'

4. U.S. Pat. No. 5,982,709 'Acoustic transducers and method of microfabrication'

5. U.S. Pat. No. 6,004,832 'Method of fabricating an electrostatic ultrasonic transducer'

The filtering operations may operate on the raw radio frequency signals. Alternatively, the processing may operate on complex baseband demodulated signals as are common in modern ultrasound systems. The processing may also occur in the analog domain using analog delay components, analog filters and analog summers.

The method also has applicability in the context of laser generated ultrasound. See the following references:

Buma T, Spisar M, O'Donnell M. 'High-frequency ultrasound array element using thermoelastic expansion in an elastomeric film'. Applied Physics Letters, vol.79, no.4, 23 Jul. 2001, pp.548–50. Publisher: AIP, USA Buma T, Spisar M, O'Donnell M. 'Thermoelastic generation of ultrasound using an erbium doped fiber amplifier' 1999 IEEE Ultrasonics Symposium. Proceedings. International Symposium (Cat. No.99CH37027). IEEE. Part vol.2, 1999, pp.1253–6 vol.2. Piscataway, N.J., USA In these cases, a laser is fired at a surface comprising a material with a high coefficient of thermal expansion (e.g., Chromium or PDMS). The rapid expansion caused by the laser pulse gives rise to an acoustic wave. A second, or more, laser is fired at a point on the surface adjacent to the first point. The excitation of this second laser is delayed and attenuated as described in the prior discussion so that the resulting acoustic wave due to the second laser at the second point cancels the result of the cross coupled wave emanating across the surface from the first point.

Figure 16:
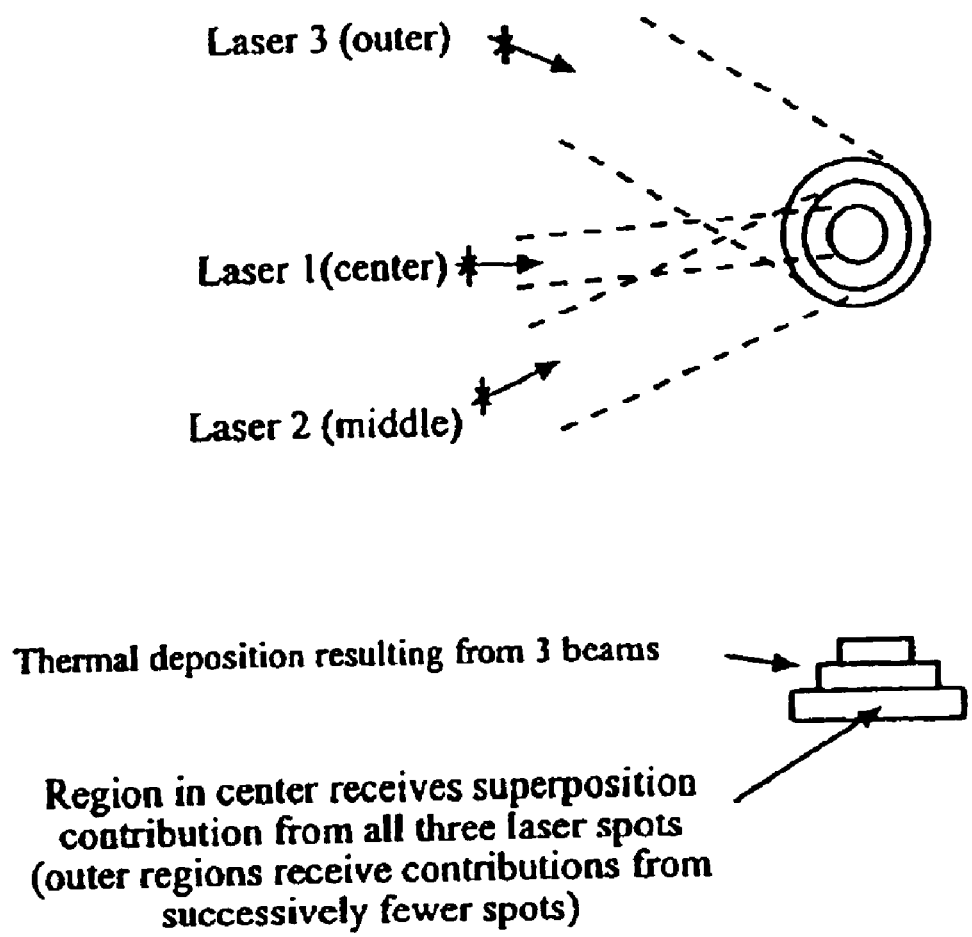
FIG. 16 is an illustration of how multiple lasers can be operated in phased co-axially aligned.

Multiple co-axially aligned laser spots are used with successive lasers focused to wider and wider spots. The center of the spot receives contributions from all lasers. Successive 'rings' going outwards receive contributions from fewer laser spots. Therefore, the approach taken is to define the excitation functions desired for each of the rings. In FIG. 16, 3 rings from 3 lasers are shown. The excitation function required for the outer ring is applied to Laser 3. The Laser 2 excitation is calculated by taking the desired function for ring 2 and subtracting from this the contribution already being made by Laser 3. Finally, the contributions from Laser 2 and Laser 1 are subtracted from the desired function for ring 1, and this residual signal is applied to Laser 1. The excitation functions may be approximations since only 'positive' pressures can be generated—since only heating and associated expansion is available. The idea here would be to superimpose the outer rings so that the waves generated by the heating in the outer rings causes an acoustic wave approximately 180 degrees out of phase with respect to the wave propagating outwards from the center spot.

The Matlab code below is operable to read output from PZFlex for input excitation and output from central and adjacent elements and then calculate the required additional excitation to be applied to an adjacent element so as to cancel the effect of cross coupling.

```
% Matlab program to do the decoupling calculation
% Read PZFlex finite element data files for
% 1 Input to 'central' element-assume Flex files are in matlab form
% 2 Output from 'central' element
% 3 Output from adjacent element
load input
load output_center
load output_adjacent
load time
ns=8192;                          % Use 2 ^ N samples
ts=time(2)-time(1);               % Time axis
t=(1:ns)*ts;
input_fft=fft(input);             % FFTs
output_center_fft=fft(output_center);
output_adjacent_fft=fft(output_adjacent);
fmax=(1/ts)/2;                    % Maximum frequency
fs=fmax/ns;                       % Sample frequency
f=(1:ns)*fs;                      % Frequency axis
% Transfer function calculation
trans_func=output_center_fft./input_fft;
% required excitation for the input to the adjacent element
reqd_excit=output_adjacent_fft./trans_func;
reqd_pulse=-real(ifft(reqd_excit));   % Required excitation to adjacent
```

A. Transmitting Mode Model

Figure 17:
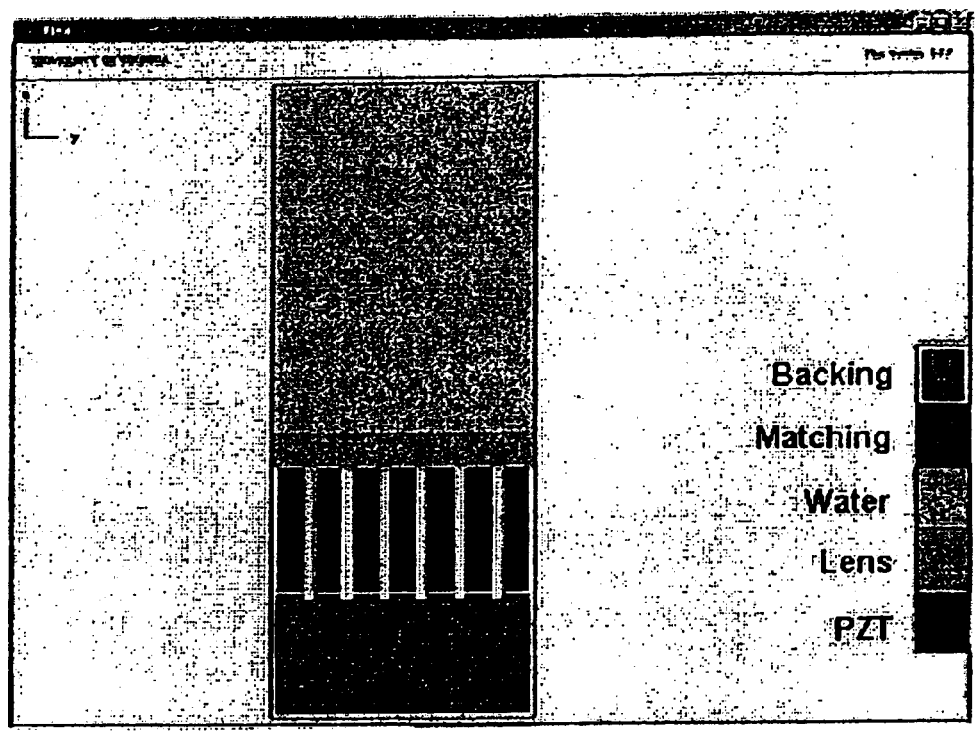
FIG. 17 is one embodiment of a modeled transducer.

A 2D ultrasound transducer array model is modeled using PZFlex. The model is illustrated in FIG. 17. The actual FEA model takes advantage of the symmetry plane and hence only the FEA models one half of the device illustrated. Important acoustic properties and geometry design parameters are described in the Tables 1 and 2.

TABLE 1

Acoustic properties for the FEA model

| Material | Impedance (MRayl) |
| --- | --- |
| PZT | 34.2 |
| Matching material | 3.92 |
| Backing material | 2.15 |
| Lens | 1.5 |

TABLE 2

Geometry design parameters for the FEA model

| Composite layer thickness | 0.70 mm | Element pitch | 0.30 mm |
| --- | --- | --- | --- |
| Backing layer thickness | 1.00 mm | Elevation Length | 10.0 mm |
| Matching layer thickness | 0.35 mm | Kerf width | 0.10 mm |
| Lens layer thickness | 0.30 mm | Kerf cut depth into backing | 0.08 mm |

There are seven elements indexed from 1 to 7 simulated in this model, where 4 is the center element (FIG. 4). The pressure output signals are measured at seven field points immediately above the center of elements. In these simulations we assume a 50 Ω source impedance. When we transmit on the central element, we set the voltage to zero at the source for the adjacent elements—so that the adjacent elements are properly terminated with 50 Ω to ground. The adjacent elements are not directly shorted to ground. This approach is necessary in order to apply the current superposition theorem correctly. The circuit is illustrated in FIG. 5. We use a wideband Gaussian pulse (2.5 MHz, 80% −6 dB fractional bandwidth) as the central element excitation. Time domain records of pressure outputs were transferred to a PC running Matlab (Mathworks, Natick, Mass.). Using an FFT in Matlab, we converted the time domain records to their equivalent frequency domain responses and form the frequency domain transfer functions and crosstalk functions. These responses were then used to populate the matrix equation (Equation 1). Our initial calculations use as many pressure measuring locations as transducer source points. Therefore, we are using a square matrix amenable to standard Gaussian elimination.

Figure 18:
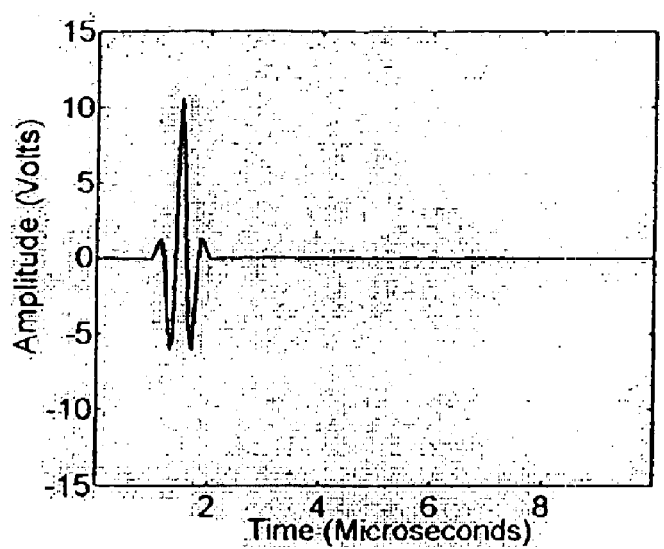
FIG. 18 illustrates one embodiment of a transmit pulse.
Figure 19:
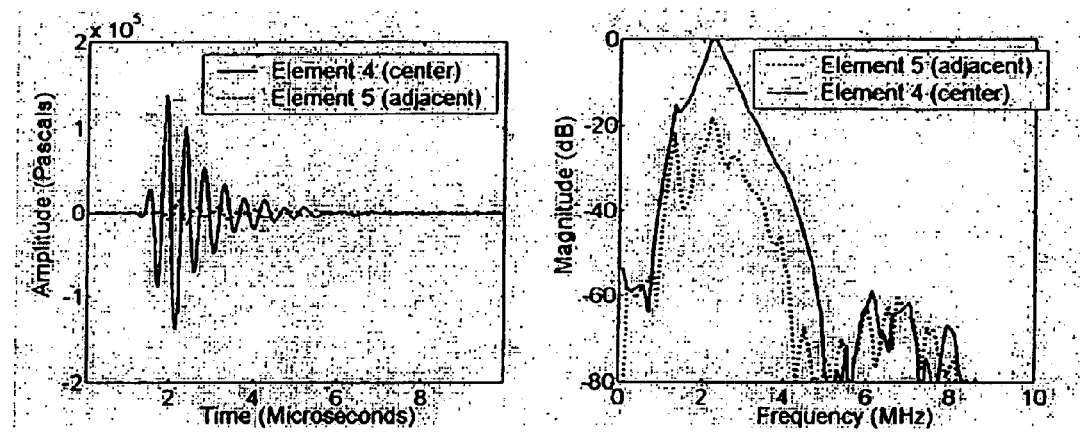
FIG. 19 shows the pressure on two elements in a response to the pulse of FIG. 18.

FIG. 18 illustrates the applied input pulse to (center) Element 4 in both time and frequency domain while the other elements are grounded. FIG. 19 illustrates the pressure outputs from Elements 4 and 5, respectively, in both time and frequency domain. It is evident from these figures that the crosstalk level in the transmit mode is approximately −18 dB. To first order, the crosstalk signal is a delayed and attenuation version of the desired signal output from Element 4.

Figure 20:
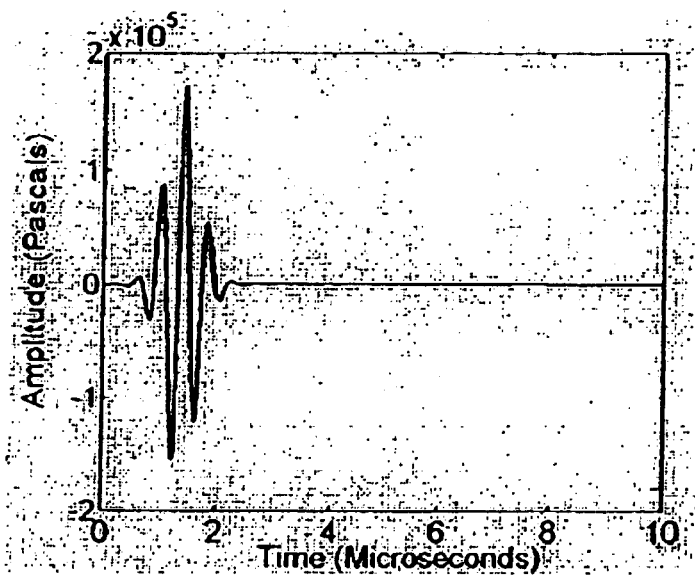
FIG. 20 represents one embodiment of a desired output.
Figure 21:
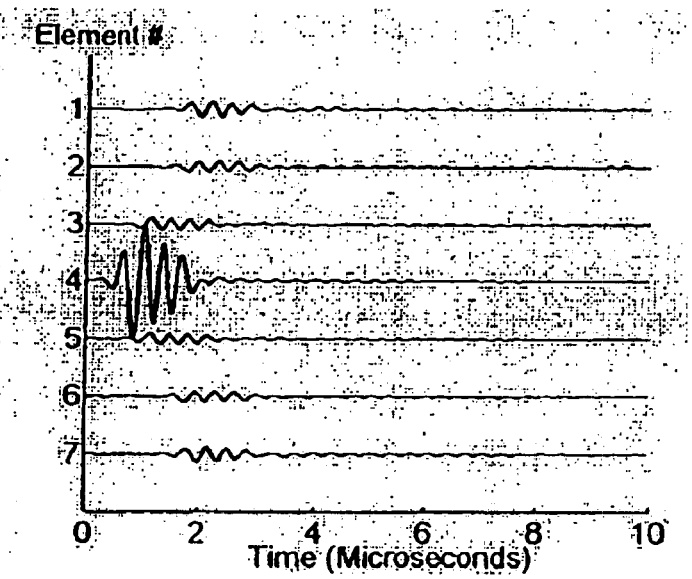
FIG. 21 represents cross talk components for application to other elements in one embodiment.

FIG. 20 illustrates the selected desired output waveform from the central element. In the interests of transmission efficiency, this waveform is chosen to be somewhat similar to the observed output for a wideband Gaussian excitation. FIG. 21 illustrates the excitation functions to be applied to each of elements 1, 2, 3 and 4, where the 4th is the central element. The functions applied to 5, 6 and 7 correspond to those applied to 3, 2 and 1 respectively due to the symmetry of the structure. These functions were derived from the solution to Equation 1. The actual matrix solution is performed in the frequency domain and the waveforms illustrated in FIG. 22 are obtained via an inverse Fourier transform.

Figure 22:
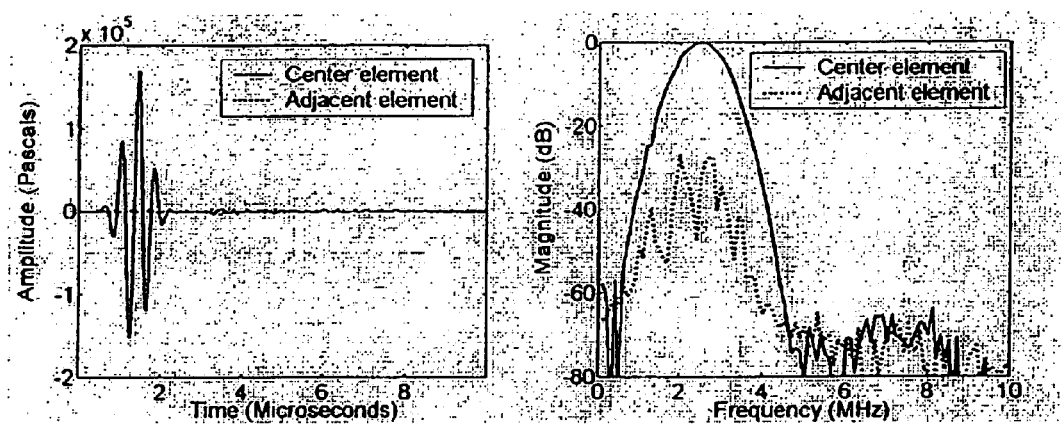
FIG. 22 represents the outputs responsive to the components of FIG. 21.

FIG. 22 illustrates the pressure output obtained from the central and adjacent elements when the excitation functions illustrated in FIG. 21 are applied to the transducer terminals. A significant reduction in crosstalk has been achieved. Crosstalk has been reduced from −18 dB to −27 dB.

The crosstalk reduction process is repeated using approximately twice as many pressure field sample points—one in front of the center of each element and one in additional point midway between these sample points—i.e. above the intermediate kerf region. In this case there are 13 field points for the 7 transducer elements. In fact, due to symmetry, only 7 field points and 4 transducer elements are analyzed. Again, a broadband Gaussian pulse, identical to that used above, is used as the desired central element output. The excitation functions are obtained after finding a pseudo-inverse solution to the matrix equation (Equation 3). The actual waveforms calculated using this second approach, and the consequent reduction in crosstalk, are similar to those for the square matrix case (Equation 1).

In one embodiment, an array of waveforms are generated for forming a focused beam. The waveform applied to each or a subset of elements has a component that is a delayed, filtered and possibly inverted form of the excitation of an adjacent element. The beamformed imaging signals have differential delays to form the focus but the crosstalk canceling signals have uniform delays with respect to immediate neighbors since propagation time between adjacent elements is always the same.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for reducing inter element cross talk in a transmit mode of a diagnostic ultrasound array, the method comprising:
   (a) generating a first waveform for a first element, the first waveform having a first component operable to reduce crosstalk from a second waveform at a second element;
   (b) applying the first waveform to the first element; and
   (c) substantially simultaneously with (b), applying the second waveform to the second element.

2. The method of claim 1 wherein the second waveform has a second component operable to reduce crosstalk from the first waveform at the first element.

3. The method of claim 1 wherein (b) comprises:
   (b1) applying the first component as a separate waveform from a third component, the third component operable for ultrasound imaging; and
   (b2) combining the first and third component by application to the transducer.

4. The method of claim 1 wherein (b) comprises:
   (b1) applying the first component as a separate waveform from a third component, the third component operable for ultrasound imaging; and
   (b2) combining the first and third component with a summer.

5. The method of claim 1 wherein (a) comprises generating the first component and a third component as a single waveform, the third component operable for ultrasound imaging.

6. The method of claim 1 further comprising:
   (d) performing (a), (b) and (c) for each transmit waveform across a multi-channel transmit aperture.

7. The method of claim 1 further comprising:
   (d) determining a crosstalk characteristic from the first element to the second element, the second element adjacent to the first element; and
   (e) generating the first component as a function of the crosstalk characteristic.

8. The method of claim 7 wherein (d) comprises:
   (d1) performing one of calculating and measuring the crosstalk characteristic for at least the first element; and
   (d2) populating a matrix as function of the crosstalk characteristic.

9. The method of claim 1 wherein (a) comprises generating the first component wherein the first waveform is modified from a desired imaging pulse to take account of crosstalk from the second element.

10. The method of claim 1 further comprising:
    (d) filtering the second waveform; and
    (e) delaying the second waveform;
    wherein at least one of the filtering and delaying is a function of a crosstalk characteristic and the first component comprises the filtered and delayed second waveform.

11. The method of claim 1 wherein the first component is at least one of: delayed, filtered, phase shifted, inverted and combinations thereof of at least a second component of the second waveform.

12. The method of claim 11 wherein the second waveform has a third component, the third component at least one of: delayed, filtered, phase shifted, inverted and combinations thereof of at least a part of the first waveform.

13. A method for reducing inter element crosstalk in a receive mode in a diagnostic ultrasound array, the method comprising:
    (a) receiving a first signal at a first element;
    (b) receiving a second signal at a second element; and
    (c) modifying the first signal as a function of a crosstalk characteristic between the first and second elements, the modification operable to reduce crosstalk from the second signal.

14. The method of claim 13 wherein (c) comprises:
    (c1) filtering the second signal as a function of the crosstalk characteristic; and
    (c2) adding the filtered second signal to the first signal.

15. The method of claim 13 further comprising:
    (d) performing one of calculating and measuring the crosstalk characteristic.

16. A system for reducing inter element crosstalk in a transmit mode, the system comprising:
    a transducer array having first and second elements;
    a first transmit beamformer channel having at least a first waveform generator, the first transmit beamformer channel connected with the first element;
    a second transmit beamformer channel having at least a second waveform generator, the second transmit beamformer channel connected with the second element,
    wherein the first waveform generator is operable to generate a first waveform having a first component operable to reduce crosstalk from a second waveform generated by the second waveform generator.

17. The system of claim 16 wherein the first transmit beamformer is operable to apply the first waveform to the first element substantially simultaneously with the second transmit beamformer applying the second waveform to the second element, the first component operable to reduce crosstalk in the first element from the second waveform applied to the second element.

18. The system of claim 16 wherein the second waveform generator is operable to generate a second waveform having a second component operable to reduce crosstalk from the first waveform generated by the first waveform generator.

19. The system of claim 16 wherein the first channel also comprises:
    a third waveform generator operable to generate a third component, the third component operable for ultrasound imaging, wherein the first and third components are combined by one of:

application to the first element; and a summer in the first channel.

20. The system of claim 16 wherein the first waveform generator is operable to generate the first component and a third component as a single waveform, the third component operable for ultrasound imaging.

21. The system of claim 16 further comprising transmit beamformer channels for each element of a transmit aperture, each transmit beamformer channel operable to generate a first signal for reducing crosstalk from other elements in addition to a second signal for ultrasound imaging.

22. The system of claim 16 wherein the first beamformer channel further comprises:

a filter connected with the second beamformer channel for filtering the second waveform; and a delay for delaying the filtered second waveform;

wherein at least one of the filtering and delaying is a function of a crosstalk characteristic and the first component comprises the filtered and delayed second waveform.

23. A method for reducing inter element crosstalk in a transmit mode in a diagnostic ultrasound array, the method comprising:

(a) generating a plurality of waveforms for a plurality of elements, respectively, in a transmit aperture;

(b) focusing a first component in the plurality of waveforms to at least a point along a beam; and (c) providing a second component in the plurality of waveforms, the second component a function of one or more of the plurality of waveforms for one or more adjacent elements, respectively, wherein the second component have uniform delays with respect to the second component of adjacent elements.

* * * * *

UNITED STATES PATENT AND TRADEMARK OFFICE
CERTIFICATE OF CORRECTION

PATENT NO.   : 6,918,877 B2
DATED        : July 19, 2005
INVENTOR(S)  : John A. Hossack and Gregory L. Wojcik It is certified that error appears in the above-identified patent and that said Letters Patent is hereby corrected as shown below:

<u>Title page,</u>
Item [75], Inventors, substitute -- Wojcik -- for "Woicik".

Signed and Sealed this

Fourth Day of April, 2006

JON W. DUDAS
*Director of the United States Patent and Trademark Office*